(12) United States Patent
Hunter et al.

(10) Patent No.: US 7,027,202 B1
(45) Date of Patent: Apr. 11, 2006

(54) SILICON SUBSTRATE AS A LIGHT MODULATOR SACRIFICIAL LAYER

(76) Inventors: James Hunter, 253 Victor Ave., Campbell, CA (US) 95008; Christopher S. Gudeman, 19148 Old Vineyard Rd., Los Gatos, CA (US) 95033

( * ) Notice: Subject to any disclaimer, the term of this patent is extended or adjusted under 35 U.S.C. 154(b) by 240 days.

(21) Appl. No.: 10/377,994

(22) Filed: Feb. 28, 2003

(51) Int. Cl.
*G02B 26/00* (2006.01)
*G02B 26/02* (2006.01)
*G02B 5/18* (2006.01)

(52) U.S. Cl. .................. 359/291; 359/231; 359/573
(58) Field of Classification Search ................ 359/223, 359/224, 230, 231, 290–292, 295, 298, 572, 359/573
See application file for complete search history.

(56) References Cited

U.S. PATENT DOCUMENTS

| 1,525,550 | A | 2/1925 | Jenkins |
| 1,548,262 | A | 8/1925 | Freedman |
| RE16,767 | E | 10/1927 | Jenkins |
| 1,814,701 | A | 7/1931 | Ives |
| 2,415,226 | A | 2/1947 | Sziklai ................ 178/5.4 |

(Continued)

FOREIGN PATENT DOCUMENTS

| DE | 32 33 195 A1 | 3/1983 |
| DE | 43 23 799 A1 | 1/1994 |
| DE | 197 23 618 A1 | 12/1997 |
| DE | 197 51 716 A1 | 5/1998 |
| DE | 198 46 532 C1 | 5/2000 |

(Continued)

OTHER PUBLICATIONS

R. Apte, "Grating Light Valves for High Resolution Displays", Solid State Sensors and Actuators Workshop, Ph D. Dissertation, Stanford University (Jun. 1994).

O. Solgaard, "Integrated Semiconductor Light Modulators for Fiber–Optic and Display Applications", Ph.D. Dissertation, Stanford University Feb., 1992.

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

(Continued)

*Primary Examiner*—Georgia Epps
*Assistant Examiner*—William Choi
(74) *Attorney, Agent, or Firm*—Okamoto & Benedicto LLP

(57) ABSTRACT

An optical MEM device is fabricated with a patterned device layer formed on a silicon wafer. Preferably, the patterned device layer is patterned with plurality of ribbons and/or access trenches. The central portion of the ribbon is released from the silicon wafer using a selective etch process, wherein a cavity is formed under the central portion of the ribbon, while opposing ribbon ends remain attached to the wafer. The selective etching process preferably utilizes an enchant comprising xenon difluoride. In accordance with further embodiments, the silicon wafer is doped, patterned or otherwise modified to enhance the selectivity of the etching process.

13 Claims, 9 Drawing Sheets

U.S. PATENT DOCUMENTS

| | | |
|---|---|---|
| 2,783,406 A | 2/1957 | Vanderhooft .................. 313/70 |
| 2,920,529 A | 1/1960 | Blythe .......................... 88/73 |
| 2,991,690 A | 7/1961 | Grey et al. .................. 88/16.6 |
| RE25,169 E | 5/1962 | Glenn |
| 3,256,465 A | 6/1966 | Weissenstern et al. ...... 317/101 |
| 3,388,301 A | 6/1968 | James ........................ 317/234 |
| 3,443,871 A | 5/1969 | Chitayat .................... 356/106 |
| 3,553,364 A | 1/1971 | Lee ............................ 178/7.3 |
| 3,576,394 A | 4/1971 | Lee ............................ 178/7.3 |
| 3,600,798 A | 8/1971 | Lee .............................. 29/592 |
| 3,656,837 A | 4/1972 | Sandbank ................... 350/161 |
| 3,657,610 A | 4/1972 | Yamamoto et al. ......... 317/243 |
| 3,693,239 A | 9/1972 | Dix .............................. 29/470 |
| 3,743,507 A | 7/1973 | Ih et al. ......................... 96/81 |
| 3,752,563 A | 8/1973 | Torok et al. ................ 350/151 |
| 3,781,465 A | 12/1973 | Ernstoff et al. ......... 178/5.4 BD |
| 3,783,184 A | 1/1974 | Ernstoff et al. ......... 178/5.4 BD |
| 3,792,916 A | 2/1974 | Sarna ........................ 350/163 |
| 3,802,769 A | 4/1974 | Rotz et al. .................... 352/43 |
| 3,811,186 A | 5/1974 | Marnerd et al. .............. 29/626 |
| 3,861,784 A | 1/1975 | Torok ..................... 350/162 R |
| 3,862,360 A | 1/1975 | Dill et al. ................. 178/7.3 D |
| 3,871,014 A | 3/1975 | King et al. .................... 357/67 |
| 3,886,310 A | 5/1975 | Guldberg et al. ......... 178/7.5 D |
| 3,896,338 A | 7/1975 | Nathanson et al. ......... 315/373 |
| 3,915,548 A | 10/1975 | Opittek ....................... 350/3.5 |
| 3,935,499 A | 1/1976 | Oess ........................... 313/413 |
| 3,935,500 A | 1/1976 | Oess et al. .................. 313/495 |
| 3,938,881 A | 2/1976 | Biegelsen et al. .......... 350/161 |
| 3,941,456 A | 3/1976 | Schilz et al. ................ 350/161 |
| 3,942,245 A | 3/1976 | Jackson et al. ............... 29/591 |
| 3,943,281 A | 3/1976 | Keller et al. ............. 178/7.5 D |
| 3,947,105 A | 3/1976 | Smith ........................ 353/107 |
| 3,969,611 A | 7/1976 | Fonteneau .................. 219/502 |
| 3,980,476 A | 9/1976 | Wysocki ....................... 96/1.1 |
| 3,991,416 A | 11/1976 | Byles et al. ............. 340/324 R |
| 4,001,663 A | 1/1977 | Bray ............................. 321/2 |
| 4,004,849 A | 1/1977 | Shattuck .................. 350/160 R |
| 4,006,968 A | 2/1977 | Ernstoff et al. ....... 350/160 LC |
| 4,009,939 A | 3/1977 | Okano .................. 350/162 SF |
| 4,011,009 A | 3/1977 | Lama et al. ............ 350/162 R |
| 4,012,116 A | 3/1977 | Yevick ....................... 350/132 |
| 4,012,835 A | 3/1977 | Wallick ........................ 29/591 |
| 4,017,158 A | 4/1977 | Booth ................... 350/162 SF |
| 4,020,381 A | 4/1977 | Oess et al. .................. 313/302 |
| 4,021,766 A | 5/1977 | Aine ............................. 338/2 |
| 4,034,211 A | 7/1977 | Horst et al. .......... 235/61.12 N |
| 4,034,399 A | 7/1977 | Drukier et al. ................ 357/68 |
| 4,035,068 A | 7/1977 | Rawson ..................... 353/122 |
| 4,067,129 A | 1/1978 | Abramson et al. ............ 40/563 |
| 4,084,437 A | 4/1978 | Finnegan ...................... 73/361 |
| 4,090,219 A | 5/1978 | Ernstoff et al. ............... 358/59 |
| 4,093,346 A | 6/1978 | Nishino et al. ......... 350/162 SF |
| 4,093,921 A | 6/1978 | Buss .......................... 325/459 |
| 4,093,922 A | 6/1978 | Buss .......................... 325/459 |
| 4,100,579 A | 7/1978 | Ernstoff ..................... 358/230 |
| 4,103,273 A | 7/1978 | Keller ............................ 338/2 |
| 4,126,380 A | 11/1978 | Borm ......................... 350/266 |
| 4,127,322 A | 11/1978 | Jacobson et al. ............. 353/31 |
| 4,135,502 A | 1/1979 | Peck .......................... 128/76.5 |
| 4,139,257 A | 2/1979 | Matsumoto ................. 350/6.1 |
| 4,143,943 A | 3/1979 | Rawson ..................... 350/120 |
| 4,163,570 A | 8/1979 | Greenaway ................ 283/8 A |
| 4,184,700 A | 1/1980 | Greenaway .................... 283/6 |
| 4,185,891 A | 1/1980 | Kaestner .................... 350/167 |
| 4,190,855 A | 2/1980 | Inoue ........................... 357/80 |
| 4,195,915 A | 4/1980 | Lichty et al. ............... 350/345 |
| 4,205,428 A | 6/1980 | Ernstoff et al. ........... 29/592 R |
| 4,211,918 A | 7/1980 | Nyfeler et al. .............. 235/454 |
| 4,223,050 A | 9/1980 | Nyfeler et al. .............. 427/163 |
| 4,225,913 A | 9/1980 | Bray ........................... 363/97 |
| 4,249,796 A | 2/1981 | Sincerbox et al. .......... 350/370 |
| 4,250,217 A | 2/1981 | Greenaway ................. 428/161 |
| 4,250,393 A | 2/1981 | Greenaway ................. 250/566 |
| 4,256,787 A | 3/1981 | Shaver et al. .................. 428/1 |
| 4,257,016 A | 3/1981 | Kramer, Jr. et al. ........ 322/7.51 |
| 4,290,672 A | 9/1981 | Whitefield .................. 350/358 |
| 4,295,145 A | 10/1981 | Latta .......................... 346/108 |
| 4,311,999 A | 1/1982 | Upton et al. ................ 340/755 |
| 4,327,411 A | 4/1982 | Turner ........................ 364/900 |
| 4,327,966 A | 5/1982 | Bloom ................... 350/162 R |
| 4,331,972 A | 5/1982 | Rajchman ..................... 358/60 |
| 4,336,982 A | 6/1982 | Rector, Jr. ................... 350/358 |
| 4,338,660 A | 7/1982 | Kelley et al. ............... 364/200 |
| 4,343,535 A | 8/1982 | Bleha, Jr. .................... 350/342 |
| 4,346,965 A | 8/1982 | Sprague et al. ............. 350/358 |
| 4,348,079 A | 9/1982 | Johnson ..................... 350/358 |
| 4,355,463 A | 10/1982 | Burns ........................... 29/827 |
| 4,361,384 A | 11/1982 | Bosserman .................. 350/174 |
| 4,369,524 A | 1/1983 | Rawson et al. ............. 455/506 |
| 4,374,397 A | 2/1983 | Mir ............................. 358/75 |
| 4,389,096 A | 6/1983 | Hori et al. .............. 350/339 R |
| 4,391,490 A | 7/1983 | Hartke ........................ 350/356 |
| 4,396,246 A | 8/1983 | Holman .................. 350/96.14 |
| 4,398,798 A | 8/1983 | Krawczak et al. ..... 350/162.24 |
| 4,400,740 A | 8/1983 | Traino et al. ............... 358/293 |
| 4,408,884 A | 10/1983 | Kleinknecht et al. ....... 356/355 |
| 4,414,583 A | 11/1983 | Hooker, III ................. 358/300 |
| 4,417,386 A | 11/1983 | Exner ........................... 29/590 |
| 4,418,397 A | 11/1983 | Brantingham et al. ...... 364/900 |
| 4,420,717 A | 12/1983 | Wallace et al. ............. 318/696 |
| 4,422,099 A | 12/1983 | Wolfe ......................... 358/293 |
| 4,426,768 A | 1/1984 | Black et al. ................... 29/583 |
| 4,430,584 A | 2/1984 | Someshwar et al. ........ 307/465 |
| 4,435,041 A | 3/1984 | Torok et al. ........... 350/162.24 |
| 4,440,839 A | 4/1984 | Mottier ......................... 430/2 |
| 4,443,819 A | 4/1984 | Funada et al. .............. 358/236 |
| 4,443,845 A | 4/1984 | Hamilton et al. ........... 364/200 |
| 4,447,881 A | 5/1984 | Brantingham et al. ...... 364/488 |
| 4,454,591 A | 6/1984 | Lou ............................ 364/900 |
| 4,456,338 A | 6/1984 | Gelbart ....................... 350/358 |
| 4,460,907 A | 7/1984 | Nelson ..................... 346/153.1 |
| 4,462,046 A | 7/1984 | Spight ........................ 358/101 |
| 4,467,342 A | 8/1984 | Tower ........................... 357/30 |
| 4,468,725 A | 8/1984 | Venturini .................... 363/160 |
| 4,483,596 A | 11/1984 | Marshall .................... 350/385 |
| 4,484,188 A | 11/1984 | Ott .............................. 340/728 |
| 4,487,677 A | 12/1984 | Murphy ..................... 204/247 |
| 4,492,435 A | 1/1985 | Banton et al. .............. 350/360 |
| 4,503,494 A | 3/1985 | Hamilton et al. ........... 364/200 |
| 4,511,220 A | 4/1985 | Scully ........................ 350/403 |
| 4,538,883 A | 9/1985 | Sprague et al. ............. 350/356 |
| 4,545,610 A | 10/1985 | Lakritz et al. ................ 29/589 |
| 4,556,378 A | 12/1985 | Nyfeler et al. .............. 425/143 |
| 4,558,171 A | 12/1985 | Gantley et al. .............. 425/143 |
| 4,561,011 A | 12/1985 | Kohara et al. .............. 257/713 |
| 4,561,044 A | 12/1985 | Ogura et al. .................. 362/84 |
| 4,566,935 A | 1/1986 | Hornbeck .................... 156/626 |
| 4,567,585 A | 1/1986 | Gelbart ......................... 369/97 |
| 4,571,041 A | 2/1986 | Gaudyn ........................ 353/10 |
| 4,571,603 A | 2/1986 | Hornbeck et al. ........... 346/160 |
| 4,577,932 A | 3/1986 | Gelbart ....................... 350/358 |
| 4,577,933 A | 3/1986 | Yip et al. .................... 350/358 |
| 4,588,957 A | 5/1986 | Balant et al. ................ 330/4.3 |
| 4,590,548 A | 5/1986 | Maytum ..................... 363/161 |
| 4,594,501 A | 6/1986 | Culley et al. ............... 219/492 |
| 4,596,992 A | 6/1986 | Hornbeck .............. 345/76 PH |
| 4,615,595 A | 10/1986 | Hornbeck .................... 353/122 |
| 4,623,219 A | 11/1986 | Trias ........................... 350/351 |
| 4,636,039 A | 1/1987 | Turner ........................ 350/356 |
| 4,636,866 A | 1/1987 | Hattori ......................... 357/236 |
| 4,641,193 A | 2/1987 | Glenn ........................ 358/233 |
| 4,645,881 A | 2/1987 | LeToumelin et al. ........ 379/252 |
| 4,646,158 A | 2/1987 | Ohno et al. ................. 358/236 |
| 4,649,085 A | 3/1987 | Landram ..................... 428/620 |
| 4,649,432 A | 3/1987 | Watanabe et al. ........... 358/241 |
| 4,652,932 A | 3/1987 | Miyajima et al. ........... 358/236 |
| 4,655,539 A | 4/1987 | Caulfield et al. ............. 350/3.6 |
| 4,660,938 A | 4/1987 | Kazan ........................ 350/355 |
| 4,661,828 A | 4/1987 | Miller, Jr. et al. ........... 346/108 |

| Patent | Date | Inventor | Ref |
|---|---|---|---|
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/636 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/606 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 C |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,031,144 A | 7/1991 | Persky | |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunaway et al. | 437/209 |
| 5,068,205 A | 11/1991 | Baxter et al. | 437/205 |
| 5,072,239 A | 12/1991 | Mitcham et al. | 348/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |
| 5,151,724 A | 9/1992 | Kikinis | 357/17 |
| 5,151,763 A | 9/1992 | Marek et al. | 357/26 |
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |
| 5,161,042 A | 11/1992 | Hamada | 359/41 |
| 5,162,787 A | 11/1992 | Thompson et al. | 340/794 |
| 5,164,019 A | 11/1992 | Sinton | 136/249 |

| Patent No. | Date | Inventor | Class |
|---|---|---|---|
| 5,165,013 A | 11/1992 | Faris | 395/104 |
| 5,168,401 A | 12/1992 | Endriz | 359/625 |
| 5,168,406 A | 12/1992 | Nelson | 359/855 |
| 5,170,156 A | 12/1992 | DeMond et al. | 340/794 |
| 5,170,269 A | 12/1992 | Lin et al. | 359/9 |
| 5,170,283 A | 12/1992 | O'Brien et al. | 359/291 |
| 5,172,161 A | 12/1992 | Nelson | 355/200 |
| 5,172,262 A | 12/1992 | Hornbeck | 359/223 |
| 5,177,724 A | 1/1993 | Gelbart | 369/44.16 |
| 5,178,728 A | 1/1993 | Boysel et al. | 155/656 |
| 5,179,274 A | 1/1993 | Sampsell | 250/208.2 |
| 5,179,367 A | 1/1993 | Shimizu | 340/700 |
| 5,181,231 A | 1/1993 | Parikh et al. | 377/26 |
| 5,182,665 A | 1/1993 | O'Callaghan et al. | 359/95 |
| 5,185,660 A | 2/1993 | Um | 358/60 |
| 5,185,823 A | 2/1993 | Kaku et al. | |
| 5,188,280 A | 2/1993 | Nakao et al. | 228/123 |
| 5,189,404 A | 2/1993 | Masimo et al. | 340/720 |
| 5,189,505 A | 2/1993 | Bartelink | 257/419 |
| 5,191,405 A | 3/1993 | Tomita et al. | 257/777 |
| 5,192,864 A | 3/1993 | McEwen et al. | 250/234 |
| 5,192,946 A | 3/1993 | Thompson et al. | 340/794 |
| 5,198,895 A | 3/1993 | Vick | 358/103 |
| D334,557 S | 4/1993 | Hunter et al. | D14/114 |
| D334,742 S | 4/1993 | Hunter et al. | D14/113 |
| 5,202,785 A | 4/1993 | Nelson | 359/214 |
| 5,206,629 A | 4/1993 | DeMond et al. | 340/719 |
| 5,206,829 A | 4/1993 | Thakoor et al. | |
| 5,208,818 A | 5/1993 | Gelbart et al. | 372/30 |
| 5,208,891 A | 5/1993 | Prysner | 385/116 |
| 5,210,637 A | 5/1993 | Puzey | 359/263 |
| 5,212,115 A | 5/1993 | Cho et al. | 437/208 |
| 5,212,555 A | 5/1993 | Stoltz | 358/206 |
| 5,212,582 A | 5/1993 | Nelson | 359/224 |
| 5,214,308 A | 5/1993 | Nishiguchi et al. | 257/692 |
| 5,214,419 A | 5/1993 | DeMond et al. | 340/794 |
| 5,214,420 A | 5/1993 | Thompson et al. | 340/795 |
| 5,216,278 A | 6/1993 | Lin et al. | 257/688 |
| 5,216,537 A | 6/1993 | Hornbeck | 359/291 |
| 5,216,544 A | 6/1993 | Horikawa et al. | 359/622 |
| 5,219,794 A | 6/1993 | Satoh et al. | 437/209 |
| 5,220,200 A | 6/1993 | Blanton | 257/778 |
| 5,221,400 A | 6/1993 | Staller et al. | 156/292 |
| 5,221,982 A | 6/1993 | Faris | 359/93 |
| 5,224,088 A | 6/1993 | Atiya | 369/97 |
| D337,320 S | 7/1993 | Hunter et al. | D14/113 |
| 5,226,099 A | 7/1993 | Mignardi et al. | 385/19 |
| 5,229,597 A | 7/1993 | Fukatsu | |
| 5,230,005 A | 7/1993 | Rubino et al. | 372/20 |
| 5,231,363 A | 7/1993 | Sano et al. | 332/109 |
| 5,231,388 A | 7/1993 | Stoltz | 340/763 |
| 5,231,432 A | 7/1993 | Glenn | 353/31 |
| 5,233,456 A | 8/1993 | Nelson | 359/214 |
| 5,233,460 A | 8/1993 | Partlo et al. | 359/247 |
| 5,233,874 A | 8/1993 | Putty et al. | 73/517 AV |
| 5,237,340 A | 8/1993 | Nelson | 346/108 |
| 5,237,435 A | 8/1993 | Kurematsu et al. | 359/41 |
| 5,239,448 A | 8/1993 | Perkins et al. | 361/764 |
| 5,239,806 A | 8/1993 | Maslakow | 53/432 |
| 5,240,818 A | 8/1993 | Mignardi et al. | 430/321 |
| 5,245,686 A | 9/1993 | Faris et al. | 385/120 |
| 5,247,180 A | 9/1993 | Mitcham et al. | 250/492.1 |
| 5,247,593 A | 9/1993 | Lin et al. | 385/17 |
| 5,249,245 A | 9/1993 | Lebby et al. | 385/89 |
| 5,251,057 A | 10/1993 | Guerin et al. | 359/249 |
| 5,251,058 A | 10/1993 | MacArthur | 359/249 |
| 5,254,980 A | 10/1993 | Hendrix et al. | 345/84 |
| 5,255,100 A | 10/1993 | Urbanus | 358/231 |
| 5,256,869 A | 10/1993 | Lin et al. | 250/201.9 |
| 5,258,325 A | 11/1993 | Spitzer et al. | 437/86 |
| 5,260,718 A | 11/1993 | Rommelmann et al. | 346/107 R |
| 5,260,798 A | 11/1993 | Um et al. | 358/233 |
| 5,262,000 A | 11/1993 | Welbourn et al. | 156/643 |
| 5,272,473 A | 12/1993 | Thompson et al. | 345/7 |
| 5,278,652 A | 1/1994 | Urbanus et al. | 358/160 |
| 5,278,925 A | 1/1994 | Boysel et al. | 385/14 |
| 5,280,277 A | 1/1994 | Hornbeck | 345/108 |
| 5,281,887 A | 1/1994 | Engle | 310/335 |
| 5,281,957 A | 1/1994 | Schoolman | 345/8 |
| 5,285,105 A | 2/1994 | Cain | 257/672 |
| 5,285,196 A | 2/1994 | Gale, Jr. | 345/108 |
| 5,285,407 A | 2/1994 | Gale et al. | 365/189.11 |
| 5,287,096 A | 2/1994 | Thompson et al. | 345/147 |
| 5,287,215 A | 2/1994 | Warde et al. | 359/293 |
| 5,289,172 A | 2/1994 | Gale, Jr. et al. | 345/108 |
| 5,291,317 A | 3/1994 | Newswanger | 359/15 |
| 5,291,473 A | 3/1994 | Pauli | 369/112 |
| 5,293,511 A | 3/1994 | Poradish et al. | 257/434 |
| 5,296,408 A | 3/1994 | Wilbarg et al. | 437/203 |
| 5,296,891 A | 3/1994 | Vogt et al. | 355/67 |
| 5,296,950 A | 3/1994 | Lin et al. | 359/9 |
| 5,298,460 A | 3/1994 | Nishiguchi et al. | 437/183 |
| 5,299,037 A | 3/1994 | Sakata | 359/41 |
| 5,299,289 A | 3/1994 | Omae et al. | 359/95 |
| 5,300,813 A | 4/1994 | Joshi et al. | 257/752 |
| 5,301,062 A | 4/1994 | Takahashi et al. | 359/567 |
| 5,303,043 A | 4/1994 | Glenn | 348/40 |
| 5,303,055 A | 4/1994 | Hendrix et al. | 348/761 |
| 5,307,056 A | 4/1994 | Urbanus | 340/189 |
| 5,307,185 A | 4/1994 | Jones et al. | 359/41 |
| 5,310,624 A | 5/1994 | Ehrlich | 430/322 |
| 5,311,349 A | 5/1994 | Anderson et al. | 359/223 |
| 5,311,360 A | 5/1994 | Bloom et al. | 359/572 |
| 5,312,513 A | 5/1994 | Florence et al. | 156/643 |
| 5,313,479 A | 5/1994 | Florence | 372/26 |
| 5,313,648 A | 5/1994 | Ehlig et al. | 395/800 |
| 5,313,835 A | 5/1994 | Dunn | 73/505 |
| 5,315,418 A | 5/1994 | Sprague et al. | 359/41 |
| 5,315,423 A | 5/1994 | Hong | 359/124 |
| 5,315,429 A | 5/1994 | Abramov | |
| 5,319,214 A | 6/1994 | Gregory et al. | 250/504 R |
| 5,319,668 A | 6/1994 | Luecke | 372/107 |
| 5,319,789 A | 6/1994 | Ehlig et al. | 395/800 |
| 5,319,792 A | 6/1994 | Ehlig et al. | 395/800 |
| 5,320,709 A | 6/1994 | Bowden et al. | 438/745 |
| 5,321,416 A | 6/1994 | Bassett et al. | 345/8 |
| 5,323,002 A | 6/1994 | Sampsell et al. | 250/252.1 |
| 5,323,051 A | 6/1994 | Adams et al. | 257/417 |
| 5,325,116 A | 6/1994 | Sampsell | 346/108 |
| 5,327,286 A | 7/1994 | Sampsell et al. | 359/561 |
| 5,329,289 A | 7/1994 | Sakamoto et al. | 345/126 |
| 5,330,301 A | 7/1994 | Brancher | 414/417 |
| 5,330,878 A | 7/1994 | Nelson | 430/311 |
| 5,331,454 A | 7/1994 | Hornbeck | 359/224 |
| 5,334,991 A | 8/1994 | Wells et al. | 345/8 |
| 5,339,116 A | 8/1994 | Urbanus et al. | 348/716 |
| 5,339,177 A | 8/1994 | Jenkins et al. | 359/35 |
| 5,340,772 A | 8/1994 | Rosotker | 437/226 |
| 5,345,521 A | 9/1994 | McDonald et al. | 385/19 |
| 5,347,321 A | 9/1994 | Gove | 348/663 |
| 5,347,378 A | 9/1994 | Handschy et al. | 359/53 |
| 5,347,433 A | 9/1994 | Sedlmayr | 362/32 |
| 5,348,619 A | 9/1994 | Bohannon et al. | 156/664 |
| 5,349,687 A | 9/1994 | Ehlig et al. | 395/800 |
| 5,351,052 A | 9/1994 | D'Hont et al. | 342/42 |
| 5,352,926 A | 10/1994 | Andrews | 257/717 |
| 5,354,416 A | 10/1994 | Okudaira et al. | 156/643 |
| 5,357,369 A | 10/1994 | Pilling et al. | 359/462 |
| 5,357,803 A | 10/1994 | Lane | 73/517 B |
| 5,359,349 A | 10/1994 | Jambor et al. | 345/168 |
| 5,359,451 A | 10/1994 | Gelbart et al. | 359/285 |
| 5,361,131 A | 11/1994 | Tekemori et al. | 356/355 |
| 5,363,220 A | 11/1994 | Kuwayama et al. | 359/3 |
| 5,365,283 A | 11/1994 | Doherty et al. | 348/743 |
| 5,367,585 A | 11/1994 | Ghezzo et al. | 385/23 |
| 5,371,543 A | 12/1994 | Anderson | 348/270 |
| 5,371,618 A | 12/1994 | Tai et al. | 359/53 |
| 5,382,961 A | 1/1995 | Gale, Jr. | 345/108 |
| 5,387,924 A | 2/1995 | Gale, Jr. et al. | 345/108 |
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |

| | | | | | | | |
|---|---|---|---|---|---|---|---|
| 5,392,151 A | 2/1995 | Nelson | 359/223 | 5,489,952 A | 2/1996 | Gove et al. | 348/771 |
| 5,394,303 A | 2/1995 | Yamaji | 361/749 | 5,490,009 A | 2/1996 | Venkateswar et al. | 359/291 |
| 5,398,071 A | 3/1995 | Gove et al. | 348/558 | 5,491,510 A | 2/1996 | Gove | 348/77 |
| 5,399,898 A | 3/1995 | Rostoker | 257/499 | 5,491,612 A | 2/1996 | Nicewarner, Jr. | 361/760 |
| 5,404,365 A | 4/1995 | Hiiro | 372/27 | 5,491,715 A | 2/1996 | Flaxl | 375/344 |
| 5,404,485 A | 4/1995 | Ban | 395/425 | 5,493,177 A | 2/1996 | Muller et al. | 313/578 |
| 5,408,123 A | 4/1995 | Murai | 257/531 | 5,493,439 A | 2/1996 | Engle | 359/292 |
| 5,410,315 A | 4/1995 | Huber | 342/42 | 5,497,172 A | 3/1996 | Doherty et al. | 345/85 |
| 5,411,769 A | 5/1995 | Hornbeck | 427/534 | 5,497,197 A | 3/1996 | Gove et al. | 348/388 |
| 5,412,186 A | 5/1995 | Gale | 219/679 | 5,497,262 A | 3/1996 | Kaeriyama | 359/223 |
| 5,412,501 A | 5/1995 | Fisli | 359/286 | 5,499,060 A | 3/1996 | Gove et al. | 348/651 |
| 5,418,584 A | 5/1995 | Larson | 353/122 | 5,499,062 A | 3/1996 | Urbanus | 348/771 |
| 5,420,655 A | 5/1995 | Shimizu | 353/33 | 5,500,761 A | 3/1996 | Goossen et al. | 359/290 |
| 5,420,722 A | 5/1995 | Bielak | 359/708 | 5,502,481 A | 3/1996 | Dentinger et al. | 348/51 |
| 5,426,072 A | 6/1995 | Finnila | 437/208 | 5,504,504 A | 4/1996 | Markandey et al. | 345/214 |
| 5,427,975 A | 6/1995 | Sparks et al. | 437/79 | 5,504,514 A | 4/1996 | Nelson | 347/130 |
| 5,430,524 A | 7/1995 | Nelson | 355/200 | 5,504,575 A | 4/1996 | Stafford | 356/330 |
| 5,435,876 A | 7/1995 | Alfaro et al. | 156/247 | 5,504,614 A | 4/1996 | Webb et al. | 359/223 |
| 5,438,477 A | 8/1995 | Pasch | 361/689 | 5,506,171 A | 4/1996 | Leonard et al. | 437/187 |
| 5,439,731 A | 8/1995 | Li et al. | 428/209 | 5,506,597 A | 4/1996 | Thompson et al. | 345/85 |
| 5,442,411 A | 8/1995 | Urbanus et al. | 348/771 | 5,506,720 A | 4/1996 | Yoon | 359/224 |
| 5,442,414 A | 8/1995 | Janssen et al. | 353/98 | 5,508,558 A | 4/1996 | Robinette, Jr. et al. | 257/700 |
| 5,444,566 A | 8/1995 | Gale et al. | 359/291 | 5,508,561 A | 4/1996 | Tago et al. | 257/737 |
| 5,445,559 A | 8/1995 | Gale et al. | 451/388 | 5,508,565 A | 4/1996 | Hatakeyama et al. | 257/777 |
| 5,446,479 A | 8/1995 | Thompson et al. | 345/139 | 5,508,750 A | 4/1996 | Hewlett et al. | 348/558 |
| 5,447,600 A | 9/1995 | Webb | 216/2 | 5,508,840 A | 4/1996 | Vogel et al. | 359/291 |
| 5,448,314 A | 9/1995 | Heimbuch et al. | 348/743 | 5,508,841 A | 4/1996 | Lin et al. | 359/318 |
| 5,448,546 A | 9/1995 | Pauli | 369/112 | 5,510,758 A | 4/1996 | Fujita et al. | 333/247 |
| 5,450,088 A | 9/1995 | Meier et al. | 342/51 | 5,510,824 A | 4/1996 | Nelson | 347/239 |
| 5,450,219 A | 9/1995 | Gold et al. | 359/40 | 5,512,374 A | 4/1996 | Wallace et al. | 428/422 |
| 5,451,103 A | 9/1995 | Hatanaka et al. | 353/31 | 5,512,748 A | 4/1996 | Hanson | 250/332 |
| 5,452,024 A | 9/1995 | Sampsell | 348/755 | 5,515,076 A | 5/1996 | Thompson et al. | 345/139 |
| 5,452,138 A | 9/1995 | Mignardi et al. | 359/855 | 5,516,125 A | 5/1996 | McKenna | 279/3 |
| 5,453,747 A | 9/1995 | D'Hont et al. | 342/42 | 5,517,340 A | 5/1996 | Doany et al. | 359/41 |
| 5,453,778 A | 9/1995 | Venkateswar et al. | 347/224 | 5,517,347 A | 5/1996 | Sampsell | 359/224 |
| 5,453,803 A | 9/1995 | Shapiro et al. | 353/119 | 5,517,357 A | 5/1996 | Shibayama | 359/547 |
| 5,454,160 A | 10/1995 | Nickel | 29/840 | 5,517,359 A | 5/1996 | Gelbart | 359/547 |
| 5,454,906 A | 10/1995 | Baker et al. | 216/66 | 5,519,251 A | 5/1996 | Sato et al. | 257/666 |
| 5,455,445 A | 10/1995 | Kurtz et al. | 257/419 | 5,519,450 A | 5/1996 | Urbanus et al. | 348/600 |
| 5,455,455 A | 10/1995 | Badehi | 257/690 | 5,521,748 A | 5/1996 | Sarraf | 359/321 |
| 5,455,602 A | 10/1995 | Tew | 347/239 | 5,523,619 A | 6/1996 | McAllister et al. | 257/686 |
| 5,457,493 A | 10/1995 | Leddy et al. | 348/164 | 5,523,628 A | 6/1996 | Williams et al. | 257/777 |
| 5,457,566 A | 10/1995 | Sampsell et al. | 359/292 | 5,523,803 A | 6/1996 | Urbanus et al. | 348/771 |
| 5,457,567 A | 10/1995 | Shinohara | 359/305 | 5,523,878 A | 6/1996 | Wallace et al. | 359/290 |
| 5,458,716 A | 10/1995 | Alfaro et al. | 156/245 | 5,523,881 A | 6/1996 | Florence et al. | 359/561 |
| 5,459,492 A | 10/1995 | Venkateswar | 347/253 | 5,523,920 A | 6/1996 | Machuga et al. | 361/767 |
| 5,459,528 A | 10/1995 | Pettitt | 348/568 | 5,524,155 A | 6/1996 | Weaver | 385/24 |
| 5,459,592 A | 10/1995 | Shibatani et al. | 359/40 | 5,534,107 A | 7/1996 | Gray et al. | 156/643.1 |
| 5,459,610 A | 10/1995 | Bloom et al. | 359/572 | 5,534,883 A | 7/1996 | Koh | 345/3 |
| 5,461,197 A | 10/1995 | Hiruta et al. | 174/52.4 | 5,539,422 A | 7/1996 | Heacock et al. | 345/8 |
| 5,461,410 A | 10/1995 | Venkateswar et al. | 347/240 | 5,544,306 A | 8/1996 | Deering et al. | 395/164 |
| 5,461,411 A | 10/1995 | Florence et al. | 347/240 | 5,552,635 A | 9/1996 | Kim et al. | 257/706 |
| 5,461,547 A | 10/1995 | Ciupke et al. | 362/31 | 5,554,304 A | 9/1996 | Suzuki | 216/2 |
| 5,463,347 A | 10/1995 | Jones et al. | 330/253 | 5,576,878 A | 11/1996 | Henck | 359/224 |
| 5,463,497 A | 10/1995 | Muraki et al. | 359/618 | 5,602,671 A | 2/1997 | Hornbeck | 359/224 |
| 5,465,175 A | 11/1995 | Woodgate et al. | 359/463 | 5,606,181 A | 2/1997 | Sakuma et al. | 257/88 |
| 5,467,106 A | 11/1995 | Salomon | 345/87 | 5,606,447 A | 2/1997 | Asada et al. | 359/199 |
| 5,467,138 A | 11/1995 | Gove | 348/452 | 5,610,438 A | 3/1997 | Wallace et al. | 257/682 |
| 5,467,146 A | 11/1995 | Huang et al. | 348/743 | 5,623,361 A | 4/1997 | Engle | 359/291 |
| 5,469,302 A | 11/1995 | Lim | 359/846 | 5,629,566 A | 5/1997 | Doi et al. | 257/789 |
| 5,471,341 A | 11/1995 | Warde et al. | 359/293 | 5,629,801 A | 5/1997 | Staker et al. | 359/572 |
| 5,473,512 A | 12/1995 | Degani et al. | 361/760 | 5,640,216 A | 6/1997 | Hasegawa et al. | 349/58 |
| 5,475,236 A | 12/1995 | Yoshizaki | 257/48 | 5,658,698 A | 8/1997 | Yagi et al. | 430/11 |
| 5,480,839 A | 1/1996 | Ezawa et al. | 437/209 | 5,661,592 A | 8/1997 | Bornstein et al. | 359/291 |
| 5,481,118 A | 1/1996 | Tew | 250/551 | 5,661,593 A | 8/1997 | Engle | 359/292 |
| 5,481,133 A | 1/1996 | Hsu | 257/621 | 5,663,817 A | 9/1997 | Frapin et al. | 349/5 |
| 5,482,564 A | 1/1996 | Douglas et al. | 134/18 | 5,668,611 A | 9/1997 | Ernstoff et al. | 348/771 |
| 5,482,818 A | 1/1996 | Nelson | 430/394 | 5,673,139 A | 9/1997 | Johnson | 359/291 |
| 5,483,307 A | 1/1996 | Anderson | 353/98 | 5,677,783 A | 10/1997 | Bloom et al. | 359/224 |
| 5,485,172 A | 1/1996 | Sawachika et al. | 345/8 | 5,689,361 A | 11/1997 | Damen et al. | 359/284 |
| 5,485,304 A | 1/1996 | Kaeriyama | 359/291 | 5,691,836 A | 11/1997 | Clark | 359/247 |
| 5,485,354 A | 1/1996 | Ciupke et al. | 362/31 | 5,694,740 A | 12/1997 | Martin et al. | 53/431 |
| 5,486,698 A | 1/1996 | Hanson et al. | 250/332 | 5,696,560 A | 12/1997 | Songer | 348/436 |
| 5,486,841 A | 1/1996 | Hara et al. | 345/8 | 5,699,740 A | 12/1997 | Gelbart | 101/477 |
| 5,486,946 A | 1/1996 | Jachimowicz et al. | 359/263 | 5,704,700 A | 1/1998 | Kappel et al. | 353/31 |
| 5,488,431 A | 1/1996 | Gove et al. | 348/716 | 5,707,160 A | 1/1998 | Bowen | 400/472 |

| | | | |
|---|---|---|---|
| 5,712,649 A | 1/1998 | Tosaki ........................... 345/8 |
| 5,713,652 A | 2/1998 | Zavracky et al. ............ 353/122 |
| 5,726,480 A | 3/1998 | Pister .......................... 257/415 |
| 5,731,802 A | 3/1998 | Aras et al. .................... 345/148 |
| 5,734,224 A | 3/1998 | Tagawa et al. .............. 313/493 |
| 5,742,373 A | 4/1998 | Alvelda ....................... 349/204 |
| 5,744,752 A | 4/1998 | McHerron et al. ......... 174/52.4 |
| 5,745,271 A | 4/1998 | Ford et al. .................. 359/130 |
| 5,757,354 A | 5/1998 | Kawamura .................. 345/126 |
| 5,757,536 A | 5/1998 | Ricco et al. ................. 359/224 |
| 5,764,280 A | 6/1998 | Bloom et al. ................. 348/53 |
| 5,768,009 A | 6/1998 | Little .......................... 359/293 |
| 5,773,473 A | 6/1998 | Green et al. ................. 438/26 |
| 5,793,519 A | 8/1998 | Furlani et al. .............. 359/291 |
| 5,798,743 A | 8/1998 | Bloom ......................... 345/90 |
| 5,798,805 A | 8/1998 | Ooi et al. ..................... 349/10 |
| 5,801,074 A | 9/1998 | Kim et al. ................... 438/125 |
| 5,802,222 A | 9/1998 | Rasch et al. .................... 385/1 |
| 5,808,323 A | 9/1998 | Spaeth et al. ................. 257/88 |
| 5,808,781 A * | 9/1998 | Arney et al. ................ 359/291 |
| 5,808,797 A | 9/1998 | Bloom et al. ............... 359/572 |
| 5,815,126 A | 9/1998 | Fan et al. ....................... 345/8 |
| 5,825,443 A | 10/1998 | Kawasaki et al. ............ 349/95 |
| 5,832,148 A | 11/1998 | Yariv .......................... 385/16 |
| 5,835,255 A | 11/1998 | Miles ......................... 359/291 |
| 5,835,256 A | 11/1998 | Huibers ...................... 359/291 |
| 5,837,562 A | 11/1998 | Cho ............................. 438/51 |
| 5,841,579 A | 11/1998 | Bloom et al. ............... 359/572 |
| 5,841,929 A | 11/1998 | Komatsu et al. ............ 385/129 |
| 5,844,711 A | 12/1998 | Long, Jr. ..................... 359/291 |
| 5,847,859 A | 12/1998 | Murata ....................... 359/201 |
| 5,862,164 A | 1/1999 | Hill ............................. 372/27 |
| 5,868,854 A | 2/1999 | Kojima et al. ............... 134/1.3 |
| 5,886,675 A | 3/1999 | Aye et al. ....................... 345/7 |
| 5,892,505 A | 4/1999 | Tropper ...................... 345/208 |
| 5,895,233 A | 4/1999 | Higashi et al. .............. 438/107 |
| 5,898,515 A | 4/1999 | Furlani et al. .............. 359/290 |
| 5,903,243 A | 5/1999 | Jones ............................. 345/7 |
| 5,903,395 A | 5/1999 | Rallison et al. ............. 359/630 |
| 5,910,856 A | 6/1999 | Ghosh et al. ................ 359/291 |
| 5,912,094 A | 6/1999 | Aksyuk et al. ................ 430/5 |
| 5,912,608 A | 6/1999 | Asada ........................ 335/222 |
| 5,914,801 A | 6/1999 | Dhuler et al. ............... 359/230 |
| 5,915,168 A | 6/1999 | Salatino et al. ............. 438/110 |
| 5,919,548 A | 7/1999 | Barron et al. ............... 428/138 |
| 5,920,411 A | 7/1999 | Duck et al. .................. 359/127 |
| 5,920,418 A | 7/1999 | Shiono et al. ............... 359/246 |
| 5,923,475 A | 7/1999 | Kurtz et al. ................. 359/619 |
| 5,926,309 A | 7/1999 | Little .......................... 359/293 |
| 5,926,318 A | 7/1999 | Hebert ........................ 359/618 |
| 5,942,791 A | 8/1999 | Shorrocks et al. ........... 257/522 |
| 5,949,390 A | 9/1999 | Nomura et al. ............... 345/32 |
| 5,949,570 A | 9/1999 | Shiono et al. ............... 359/291 |
| 5,953,161 A | 9/1999 | Troxell et al. .............. 359/618 |
| 5,955,771 A | 9/1999 | Kurtz et al. ................. 257/419 |
| 5,963,788 A | 10/1999 | Barron et al. ................. 438/48 |
| 5,978,127 A | 11/1999 | Berg ........................... 359/279 |
| 5,982,553 A | 11/1999 | Bloom et al. ............... 359/627 |
| 5,986,634 A | 11/1999 | Alioshin ..................... 345/126 |
| 5,986,796 A | 11/1999 | Miles ......................... 359/260 |
| 5,995,303 A | 11/1999 | Honguh et al. ............. 359/708 |
| 5,999,319 A | 12/1999 | Castracane ................. 359/573 |
| 6,004,912 A | 12/1999 | Gudeman .................... 508/577 |
| 6,012,336 A | 1/2000 | Eaton et al. ................... 73/754 |
| 6,016,222 A | 1/2000 | Setani et al. ................ 359/571 |
| 6,025,859 A | 2/2000 | Ide et al. .................... 347/135 |
| 6,038,057 A | 3/2000 | Brazas, Jr. et al. ......... 359/291 |
| 6,040,748 A | 3/2000 | Gueissaz ..................... 335/78 |
| 6,046,840 A | 4/2000 | Huibers ...................... 359/291 |
| 6,055,090 A | 4/2000 | Miles ......................... 359/291 |
| 6,057,520 A | 5/2000 | Goodwin-Johansson .... 200/181 |
| 6,061,166 A | 5/2000 | Furlani et al. .............. 359/254 |
| 6,061,489 A | 5/2000 | Ezra ............................ 385/115 |
| 6,062,461 A | 5/2000 | Sparks et al. .............. 228/123.1 |
| 6,064,404 A | 5/2000 | Aras et al. .................. 345/507 |
| 6,069,392 A | 5/2000 | Tai et al. ..................... 257/419 |
| 6,071,652 A | 6/2000 | Feldman et al. ................ 430/5 |
| 6,075,632 A | 6/2000 | Braun ......................... 359/124 |
| 6,084,626 A | 7/2000 | Ramanujan et al. ........ 347/239 |
| 6,088,102 A | 7/2000 | Manhart ..................... 356/354 |
| 6,090,717 A | 7/2000 | Powell et al. ............... 438/710 |
| 6,091,521 A | 7/2000 | Popovich ..................... 359/15 |
| 6,096,576 A | 8/2000 | Corbin et al. ............... 438/108 |
| 6,096,656 A | 8/2000 | Matzke et al. .............. 438/702 |
| 6,097,352 A | 8/2000 | Zavracky et al. ............. 345/7 |
| 6,101,036 A | 8/2000 | Bloom ........................ 359/567 |
| 6,115,168 A | 9/2000 | Zhao et al. .................. 359/247 |
| 6,122,299 A | 9/2000 | DeMars et al. ................ 372/20 |
| 6,123,985 A | 9/2000 | Robinson et al. ............ 427/162 |
| 6,124,145 A | 9/2000 | Stemme et al. ............... 438/26 |
| 6,130,770 A | 10/2000 | Bloom ........................ 359/224 |
| 6,144,481 A | 11/2000 | Kowarz et al. ............. 359/291 |
| 6,147,789 A | 11/2000 | Gelbart ....................... 359/231 |
| 6,154,259 A | 11/2000 | Hargis et al. ............... 348/756 |
| 6,154,305 A | 11/2000 | Dickensheets et al. |
| 6,163,026 A | 12/2000 | Bawolek et al. ............ 250/351 |
| 6,163,402 A | 12/2000 | Chou et al. ................. 359/443 |
| 6,169,624 B1 | 1/2001 | Godil et al. ................. 359/237 |
| 6,172,796 B1 | 1/2001 | Kowarz et al. ............. 359/290 |
| 6,172,797 B1 | 1/2001 | Huibers ...................... 359/291 |
| 6,177,980 B1 | 1/2001 | Johnson ....................... 355/67 |
| 6,181,458 B1 | 1/2001 | Brazas, Jr. et al. ......... 359/290 |
| 6,188,519 B1 | 2/2001 | Johnson ...................... 359/572 |
| 6,195,196 B1 | 2/2001 | Kimura et al. .............. 359/295 |
| 6,197,610 B1 | 3/2001 | Toda ............................ 438/50 |
| 6,210,988 B1 | 4/2001 | Howe et al. ................... 438/50 |
| 6,215,579 B1 | 4/2001 | Bloom et al. ............... 359/298 |
| 6,219,015 B1 | 4/2001 | Bloom et al. ................. 345/87 |
| 6,222,954 B1 | 4/2001 | Riza ............................. 385/18 |
| 6,229,650 B1 | 5/2001 | Reznichenko et al. ...... 359/566 |
| 6,229,683 B1 | 5/2001 | Goodwin-Johansson .... 381/233 |
| 6,233,087 B1 * | 5/2001 | Hawkins et al. ............ 359/290 |
| 6,241,143 B1 | 6/2001 | Kuroda ..................... 228/110.1 |
| 6,249,381 B1 | 6/2001 | Suganuma |
| 6,251,842 B1 | 6/2001 | Gudeman .................... 508/577 |
| 6,252,697 B1 | 6/2001 | Hawkins et al. ............ 359/290 |
| 6,254,792 B1 | 7/2001 | Van Buskirk et al. ........ 216/13 |
| 6,261,494 B1 | 7/2001 | Zavracky et al. ............ 264/104 |
| 6,268,948 B1 * | 7/2001 | Gelbart ....................... 359/291 |
| 6,268,952 B1 | 7/2001 | Godil et al. ................. 359/291 |
| 6,271,145 B1 | 8/2001 | Toda ........................... 438/706 |
| 6,271,808 B1 | 8/2001 | Corbin .......................... 345/7 |
| 6,274,469 B1 | 8/2001 | Yu .............................. 438/592 |
| 6,282,213 B1 | 8/2001 | Gutin et al. |
| 6,290,859 B1 | 9/2001 | Fleming et al. ................ 216/2 |
| 6,290,864 B1 | 9/2001 | Patel et al. .................... 216/79 |
| 6,300,148 B1 | 10/2001 | Birdsley et al. .............. 438/15 |
| 6,303,986 B1 | 10/2001 | Shook ......................... 257/680 |
| 6,310,018 B1 | 10/2001 | Behr et al. .................. 510/175 |
| 6,313,901 B1 | 11/2001 | Cacharelis |
| 6,323,984 B1 | 11/2001 | Trisnadi ..................... 359/245 |
| 6,327,071 B1 | 12/2001 | Kimura ....................... 359/291 |
| 6,342,960 B1 | 1/2002 | McCullough ............... 359/124 |
| 6,346,430 B1 | 2/2002 | Raj et al. |
| 6,356,577 B1 | 3/2002 | Miller ......................... 372/107 |
| 6,356,689 B1 | 3/2002 | Greywall ..................... 385/52 |
| 6,359,333 B1 | 3/2002 | Wood et al. ................. 257/704 |
| 6,381,062 B1 * | 4/2002 | Kowarz et al. ............. 359/291 |
| 6,384,959 B1 | 5/2002 | Furlani et al. .............. 359/291 |
| 6,387,723 B1 | 5/2002 | Payne et al. .................. 438/48 |
| 6,392,309 B1 | 5/2002 | Wataya et al. .............. 257/796 |
| 6,396,789 B1 | 5/2002 | Guerra et al. ............... 369/112 |
| 6,418,152 B1 | 7/2002 | Davis |
| 6,421,179 B1 | 7/2002 | Gutin et al. ................. 359/572 |
| 6,438,954 B1 | 8/2002 | Goetz et al. |
| 6,445,502 B1 | 9/2002 | Islam et al. ................. 359/571 |
| 6,452,260 B1 | 9/2002 | Corbin et al. ............... 257/686 |
| 6,466,354 B1 | 10/2002 | Gudeman .................... 359/247 |
| 6,479,811 B1 | 11/2002 | Kruschwitz et al. |
| 6,480,634 B1 | 11/2002 | Corrigan ........................ 385/4 |
| 6,497,490 B1 | 12/2002 | Miller et al. ................ 359/614 |
| 6,525,863 B1 | 2/2003 | Riza ............................ 359/290 |

| | | | | | |
|---|---|---|---|---|---|
| 6,563,974 B1 | 5/2003 | A. Riza ............ 385/18 | JP | 3288369 | 3/2002 |
| 6,565,222 B1 | 5/2003 | Ishii et al. .......... 359/883 | WO | WO 90/13913 | 11/1990 |
| 6,569,717 B1 | 5/2003 | Murade | WO | WO 92/12506 | 7/1992 |
| 6,618,187 B1 * | 9/2003 | Pilossof .............. 359/295 | WO | WO 93/02269 | 2/1993 |
| 2001/0019454 A1 | 9/2001 | Tadic-Galeb et al. ...... 359/649 | WO | WO 93/09472 | 5/1993 |
| 2002/0011759 A1 * | 1/2002 | Adams et al. ............ 310/309 | WO | WO 93/18428 | 9/1993 |
| 2002/0015230 A1 | 2/2002 | Pilossof et al. .......... 359/558 | WO | WO 93/22694 | 11/1993 |
| 2002/0021485 A1 | 2/2002 | Pilossof .............. 359/295 | WO | WO 94/09473 | 4/1994 |
| 2002/0079432 A1 | 6/2002 | Lee et al. .......... 250/216 | WO | WO 94/29761 | 12/1994 |
| 2002/0105725 A1 | 8/2002 | Sweatt et al. .......... 359/566 | WO | WO 95/11473 | 4/1995 |
| 2002/0112746 A1 | 8/2002 | DeYoung et al. ......... 134/36 | WO | WO 96/02941 | 2/1996 |
| 2002/0131228 A1 | 9/2002 | Potter .............. 361/233 | WO | WO 96/08031 | 3/1996 |
| 2002/0131230 A1 | 9/2002 | Potter .............. 361/277 | WO | WO 96/41217 | 12/1996 |
| 2002/0135708 A1 | 9/2002 | Murden et al. | WO | WO 96/41224 | 12/1996 |
| 2002/0176151 A1 | 11/2002 | Moon et al. | WO | WO 97/22033 | 6/1997 |
| 2002/0195418 A1 | 12/2002 | Kowarz et al. .......... 216/13 | WO | WO 97/26569 | 7/1997 |
| 2002/0196492 A1 | 12/2002 | Trisnadi et al. .......... 398/79 | WO | WO 98/05935 | 2/1998 |
| 2003/0035195 A1 * | 2/2003 | Blech et al. .......... 359/291 | WO | WO 98/24240 | 6/1998 |
| 2003/0056075 A1 | 3/2003 | Johansson et al. | WO | WO 98/41893 | 9/1998 |
| | | | WO | WO 99/07146 | 2/1999 |
| FOREIGN PATENT DOCUMENTS | | | WO | WO 99/12208 | 3/1999 |
| EP | 0 089 044 A2 | 9/1983 | WO | WO 99/23520 | 5/1999 |
| EP | 0 261 901 A2 | 3/1988 | WO | WO 99/34484 | 7/1999 |
| EP | 0 314 437 A1 | 10/1988 | WO | WO 99/59335 | 11/1999 |
| EP | 0 304 263 A2 | 2/1989 | WO | WO 99/63388 | 12/1999 |
| EP | 0 306 308 A2 | 3/1989 | WO | WO 99/67671 | 12/1999 |
| EP | 0 322 714 A2 | 7/1989 | WO | WO 00/04718 | 1/2000 |
| EP | 0 627 644 A3 | 9/1990 | WO | WO 00/07225 | 2/2000 |
| EP | 0 417 039 A1 | 3/1991 | WO | WO 01/04674 A1 | 1/2001 |
| EP | 0 423 513 A2 | 4/1991 | WO | WO 01/006297 A3 | 1/2001 |
| EP | 0 436 738 A1 | 7/1991 | WO | WO 01/57581 A3 | 8/2001 |
| EP | 0 458 316 A2 | 11/1991 | WO | WO 02/025348 A3 | 3/2002 |
| EP | 0 477 566 A2 | 4/1992 | WO | WO 02/31575 A2 | 4/2002 |
| EP | 0 488 326 A32 | 6/1992 | WO | WO 02/058111 A2 | 7/2002 |
| EP | 0 499 566 A2 | 8/1992 | WO | WO 02/065184 A3 | 8/2002 |
| EP | 0 528 646 A1 | 2/1993 | WO | WO 02/073286 A2 | 9/2002 |
| EP | 0 530 760 A2 | 3/1993 | WO | WO 02/084375 A1 | 10/2002 |
| EP | 0 550 189 A1 | 7/1993 | WO | WO 02/084397 A3 | 10/2002 |
| EP | 0 610 665 A1 | 8/1994 | WO | WO 03/001281 A1 | 1/2003 |
| EP | 0 627 644 A2 | 12/1994 | WO | WO 03/001716 A1 | 1/2003 |
| EP | 0 627 850 A1 | 12/1994 | WO | WO 03/012523 A1 | 2/2003 |
| EP | 0 643 314 A2 | 3/1995 | WO | WP 03/016965 A1 | 2/2003 |
| EP | 0 654 777 A1 | 5/1995 | WO | WO 03/023849 A1 | 3/2003 |
| EP | 0 658 868 A1 | 6/1995 | WO | WO 03/025628 A2 | 3/2003 |
| EP | 0 658 830 A1 | 12/1995 | | | |
| EP | 0 689 078 A1 | 12/1995 | | | |
| EP | 0 801 319 A1 | 10/1997 | | | |
| EP | 0 851 492 A2 | 7/1998 | | | |
| EP | 1 003 071 A2 | 5/2000 | | | |
| EP | 1 014 143 A1 | 6/2000 | | | |
| EP | 1 040 927 A2 | 10/2000 | | | |
| GB | 0 118 365 A | 10/1983 | | | |
| GB | 2 117 564 A | 10/1983 | | | |
| GB | 2 266 385 A | 10/1993 | | | |
| GB | 2 296 152 A | 6/1996 | | | |
| GB | 2 319 424 A | 5/1998 | | | |
| JP | 53-39068 | 4/1978 | | | |
| JP | 55-111151 | 8/1980 | | | |
| JP | 57-31166 | 2/1982 | | | |
| JP | 57-210638 | 12/1982 | | | |
| JP | 60-49638 | 3/1985 | | | |
| JP | 60-94756 | 5/1985 | | | |
| JP | 60-250639 | 12/1985 | | | |
| JP | 61-142750 | 6/1986 | | | |
| JP | 61-145838 | 7/1986 | | | |
| JP | 63-234767 | 9/1988 | | | |
| JP | 63-305323 | 12/1988 | | | |
| JP | 1-155637 | 6/1989 | | | |
| JP | 40-1155637 | 6/1989 | | | |
| JP | 2219092 | 8/1990 | | | |
| JP | 4-333015 | 11/1992 | | | |
| JP | 7-281161 | 10/1995 | | | |

OTHER PUBLICATIONS

F. Sandejas, R. Apte, W. Banyai, and D. Bloom, "Surface Microfabrication of Deformable Grating Valve for High Resolution Displays," The 7$^{th}$ International Conference on Solid–State Sensors and Actuators.

P. Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Farn et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Moduators and Applications III, Aug. 8, 1989, CA pp. 86–102.

Russick et al., "Supercritical Carbon Dioxide Extraction of Solvent from Micromachined Structures," Supercritical Fluids, Chapter 18, American Chemical Society, pp. 255–269, 1997.

Buhler et al., "Linear Array of Complementary Metal Oxide Semiconductor Double–Pass Metal Micromirrors," Optical Engineering, vol. 36, No. 5, pp 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

R. Tepe, et al. "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings*, Sensors and Actuators A, pp. 7–15, 1998.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997 pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations" IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Official Components. Feb. 2001, pp. 1 of 10.

R. Plastow, "Tunable Lasers and Future Optical Networks", Forum—Tunable Laser, Aug. 2000, pp. 58 of 62.

Elisabeth Bruce, "Tunable Lasers", Communications, IEEE Spectrum, Feb. 2002, pp. 35 of 39.

M. G. Litman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Development of Digital MEMS–Based Display Technology Promises Improved Resolution, Contrast, and Speed, XP–000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", Received Jun. 4, 1976, p. 103–115.

Olga B. Spahn, et al., "High Optical Power Handling of Pop–Up Microelectromechanical Mirrors", Sandia National Laboratories, IEEE 2000, p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2," J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminium Mirror," Physical Electronics Laboratory, 1991 IEEE, pp. 547–550.

M. Parameswaran et al., "Commercial CMOS Fabricated Integrated Dynamic Thermal Scene Simulator," 1991 IEEE, pp. 29.4.1–29.4.4.

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21—A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5, 3, (1993), pp. 125–134.

Z. Parpia et al., "Modelling of CMOS Compatible High Voltage Device Structures," pp. 41–50.

Jon Gildemeister, "Xenon Difluoride Etching System," 1997, UC Berkeley MicroFabrication Manual Chapter 7.15, p. 2–5.

W. Riethmuller et al., "A smart accelerometer with on–chip electronics fabricated by a commercial CMOS process," Sensors and Actuators A. 31, (1992), 121–124.

W. Gopel et al., "Sensors– A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D. E. Ibbotson et al., "Plasmales dry etching of silicon with fluorine–containing compounds," 1984 American Institute of Physics, pp. 2939–2942.

M.H. Hecht et al., "A novel x–ray photoelectron spectroscopy study of the AI/SiO2 interfaces," 1985 American Institute of Physics, pp. 5256–52616.

Daniel L. Flamm et al., "XeF2 and F–Atom Reactions with Si: Their Significance for Plasma Etching,," Solid State Technology, V. 26, #4, Apr. 1983, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Application," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 1994, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933–1935.

P. C. Kundu et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R. W. Corrigan et al., "Calibration of a Scanned Linear Grating Light–Valve, Projection System for E–Cinema Applications", Silicon Light Machines, SID '99, San Jose, CA, 27 pgs, 1999.

R. W. Corrigan et al., "Calibration of a Scanned Linear Grating Light–Valve, Projection System", Silicon Light Machines, San Jose, CA, 4 pgs, May 18, 1999.

"Introduciton to Cryptography", http://www.ssh.fi/tech/crpto/into.html, 35 pgs, Jun. 21, 1999.

"Deep Sky Black", Equinox Interscience, www.cisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neural–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuit Conference, 1994.

Henck, S.A., "Lubirication of Digital Micromirror Devices™", Tribology Letters, No. 3, pp. 239–247, 1997.

K. W. Goossen et al., "Silicon Modulator Based on Mechanically–Active Anti–Reflection Layer with 1 Mbit/scc Capability for Fiber–in–the–Loop Applications", IEEE Protonics Technology Letters, vol. 6, No. 9, Sep. 1994, pp. 1119–1121.

J. A. Walker et al., "Demonstration of a Gain Flattened Optical Amplifier with Micromechanical Equilizer Element", Lucent Technologies, pp. 13–14.

A. P. Payne et al., "Resonance Measurements of Stresses in $Al/Si_3N_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel l.ayouts", SID 95 Digest, XP 2020715, pp. 931–933.

* cited by examiner

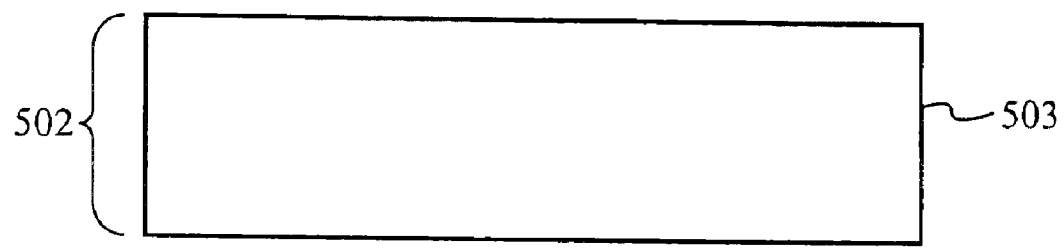
Fig. 5A
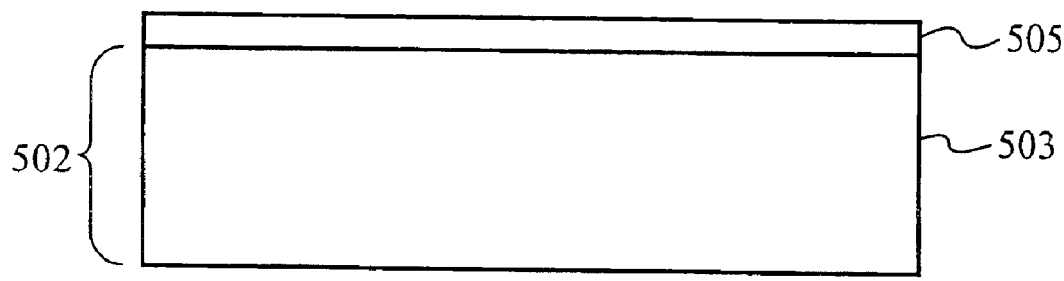
Fig. 5B
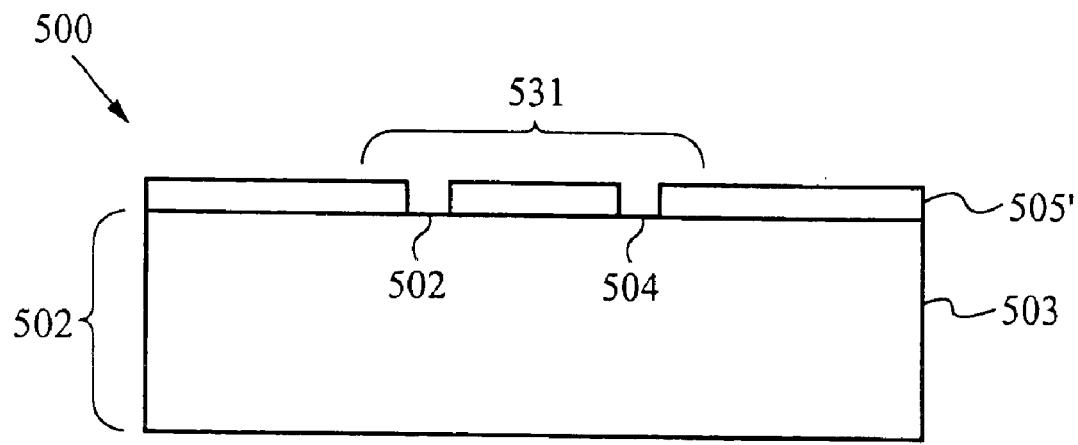
Fig. 5C
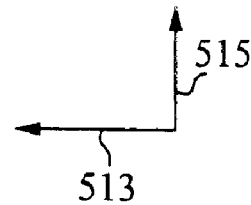

SILICON SUBSTRATE AS A LIGHT MODULATOR SACRIFICIAL LAYER

FIELD OF THE INVENTION

The present invention relates to (micro-electro mechanical) MEM devices. More particularly, the present invention relates to controlled etch processes for fabricating optical MEM devices.

BACKGROUND OF THE INVENTION

Optical MEM devices are used to modulate one or more wavelengths of light. Optical MEM devices can have applications in display, print and electrical device technologies. Examples of optical MEM devices which utilize suspended micro-ribbon structures to modulate light are disclosed in the U.S. Pat. Nos. 5,311,360, 5,841,579 and 5,808,797, all issued to Bloom et al., the contents of which are hereby incorporated by reference.

Briefly, an optical MEM device described in the above referenced patents has one or more sets of movable ribbons that comprise a support layer and a reflective top-layer. The support layer is preferably a silicon nitride layer and the reflective toplayer is preferably an aluminum layer. The ribbon structures are typically secured to a substrate through opposite ends of the ribbon, whereby center portions of the ribbons, referred to herein as the active portions, move up and down to modulate an incident light source.

The optical MEM devices described above, and methods for making the same, suffer from several shortcomings. Firstly, fabrication can involve numerous time consuming steps, raising the cost of the devices. Secondly, the dielectric materials typically used to fabricate these devices (silicon nitride and silicon oxide) result in devices which exhibit a propensity to charge. Charging can perturb or shift the switching bias voltage required to operate the devices possibly leading to unreliable or irreproducible optical signals. Thirdly, fabrication steps of these devices are often incompatible with materials and/or fabrication steps used to make integrated circuits. Accordingly, optical MEM devices and integrated circuits generally need to be fabricated separately and then laboriously combined in subsequent steps.

What is desired is an optical MEM device which exhibits reduced charging characteristics and which can be fabricated with fewer processing steps. Further what is desired is a method of fabricating optical MEM devices which can be compatible with standard (complementary metal oxide semiconductor) CMOS materials and/or (integrated circuit) IC wafer processing.

SUMMARY OF THE INVENTION

Embodiments of the invention are directed to a device comprising a substrate structure having a cavity and support regions. The device has one or more micro-structures suspended over the cavity coupled to the support regions of the substrate. The device is preferably an optical MEM device and the micro-structures are preferably ribbons configured to modulate light having a wavelength in a range of about 0.1 to about 2.0 microns. The ribbons preferably have lengths in a range of about 5 to about 2000 microns and widths in a range of about 0.5 to about 20 microns. The ribbons preferably comprise a layer of silicon nitride in a range of about 200 to about 2000 Angstroms thick and a reflective layer of aluminum in a range of about 200 to about 2000 Angstroms thick.

In accordance with the embodiments of the invention, the ribbons are formed by depositing a device layer directly onto a single crystal silicon wafer substrate. The device layer is then cut into ribbons with the preferred dimensions, and a cavity is formed in the silicon wafer under the center portions, or active portions, of the ribbons such that the ribbons remain attached at opposing ends to the wafer and are suspended over the cavity. The substrate can have any number of layers including silicon dioxide and silicon nitride layers, but preferably the sacrificial material is the single crystal silicon substrate that is either doped, undoped or otherwise patterned, as explained below. The cavity is preferably formed by a controlled etch process utilizing xenon difluoride.

Before etching the cavity into the silicon wafer substrate, the wafer can be modified to control the location, the direction and/or the rate of the etching process. In accordance with the embodiments of the invention, the single crystal wafer substrate is selectively modified in etching regions of the wafer and/or in the support regions of the wafer. The wafer is selectively modified by doping the etching regions and/or the support regions of the wafer with a dopant, such as boron, phosphorous and/or other suitable dopants. The wafer is selectively modified with one or more dopants using an ion implant process or other suitable process, whereby the chemical composition or structure of the wafer is modified.

In still further embodiments of the invention, access holes and/or access trenches are formed through the ribbons prior to etching the cavity in the wafer substrate. The access holes and/or access trenches are formed in order to increase the local etching rate of the silicon wafer under the center portions, or active portions, of the ribbons.

BRIEF DESCRIPTION OF THE DRAWINGS

FIGS. 5a–e illustrate steps of making a device comprising a plurality of ribbon structures are suspended over a cavity, in accordance with the embodiments of the invention.

DETAILED DESCRIPTION OF THE EMBODIMENTS

Figure 1A:
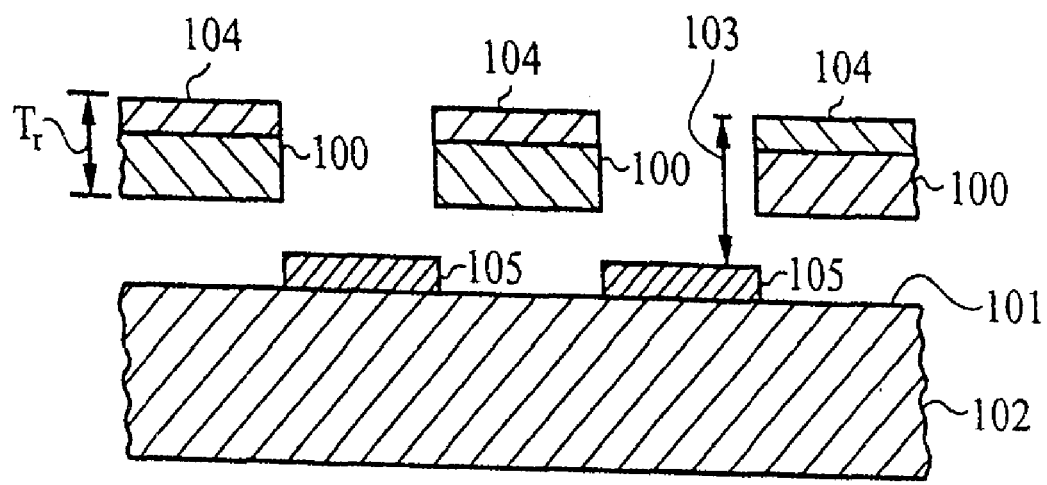
FIGS. 1a–b show cross-sectional representations of a micro-structure comprising a plurality of moveable ribbon structures, in accordance with the embodiments of the invention.

Referring to FIG. 1a, an optical MEM device can have a plurality of movable ribbons 100 with reflective surfaces 104 spatially arranged over a substrate 102 and a plurality of reflective surfaces 105 spatially arranged on the substrate 102 between movable ribbons 100, such that adjacent reflective surfaces 104 and 105 modulate light, as described below. The surfaces 104 and 105 are made to be reflective by depositing a thin film of reflective material, such as silver or aluminum, on the ribbons 100 and substrate 102, respectively. The ribbons 100 and the substrate 102 are preferably formed from silicon-based materials such as silicon nitride. A height difference 103 between the reflective surfaces 104 and 105 is preferably configured to be $\lambda/2$ when the ribbons 100 are in an up position, as shown in FIG. 1a. When light having a wavelength $\lambda$ impinges on the compliment of reflective surfaces 104 and 105, the light that is reflected from the surfaces 104 and 105 is in phase, thereby generating the conditions for constructive interference. Light which strikes the reflective surfaces 105 travels $\lambda/2$ further than the light striking the reflective surfaces 104 of the ribbons 100. The light that is reflected back from the reflective surfaces 105 travels an additional $\lambda/2$ for a total of one complete wavelength $\lambda$. Therefore, the compliment of the reflective surfaces 104 and 105 function as a mirror to the incident light source with a wavelength $\lambda$.

Figure 1B:
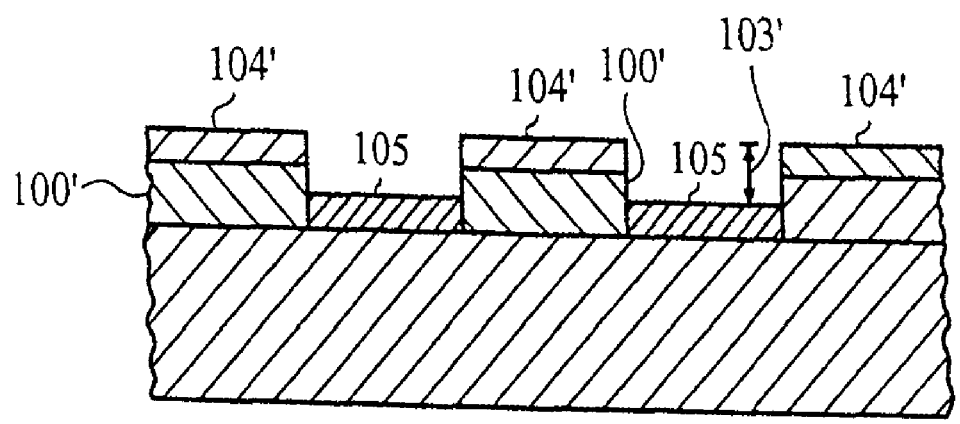

By applying an appropriate bias voltage across the ribbons 100 and the substrate 102, the ribbons 100 move towards the substrate 102, as shown in FIG. 1b. A thickness $T_r$ of the ribbons 100 can be designed to be $\lambda/4$ such that the distance 103' is also $\lambda/4$. When light having a wavelength $\lambda$ impinges on surfaces 104' and 105 with the ribbons 100 in a down position, as shown in FIG. 1b, the light reflected from the surfaces 104' of the ribbons 100 will be out of phase with the light reflected from the surfaces 105, thereby generating conditions for destructive interference. By alternating the ribbons 100 between the positions for constructive interference, as shown in FIG. 1a, and the positions for destructive interference, as shown in FIG. 1b, the optical MEM device is capable of modulating light having a wavelength $\lambda$.

Figure 2A:
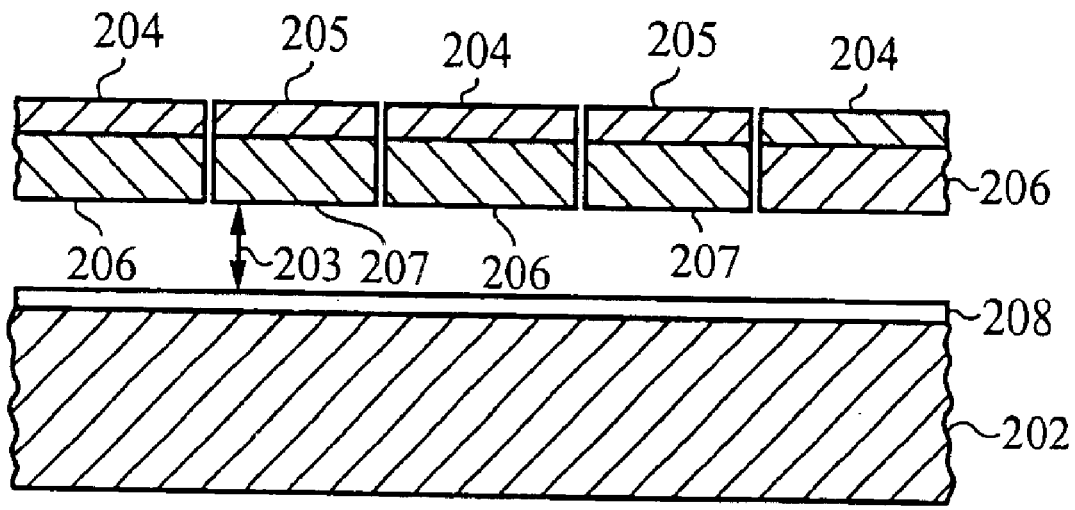
FIGS. 2a–b show cross-sectional representations of a micro-structure comprising two sets of ribbon structures, in accordance with the embodiments of the invention.
Figure 2B:
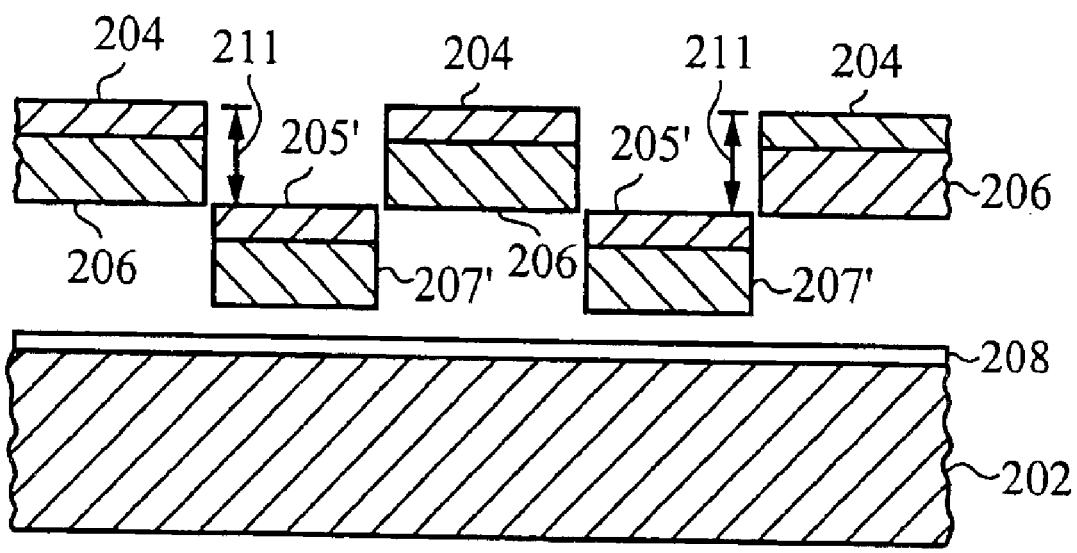

FIGS. 2a–b illustrate cross sectional views of an optical MEM device, in accordance with an alternative construction. The optical MEM device can have pairs of alternating ribbons 206 and 207 that are approximately in the same reflective plane, wherein adjacent ribbons 206 and 207 form sets or ribbon pairs. Referring to FIG. 2a, the ribbons 206 and 207 are suspended over a substrate structure 202 by a distance 203. The ribbons 206 and 207 are provided with reflective surfaces 204 and 205, respectively. The substrate 202, or a portion thereof, can also have a reflective surface 208. In accordance with the embodiments of the invention, the reflective surface 208 of the substrate 202 and the reflective surfaces 204 and 205 of the ribbons 206 and 207 are configured to be separated by a distance approximately equal to a multiple of $\lambda/2$ of the impinging light source. Thus, a portion of light that is reflected from the compliment of surfaces 204, 205 and 208 are all in phase and a maximum intensity of reflected light is observed. In operation, the optical MEM device alternates between the conditions for constructive and destructive interference by moving the first set of ribbons 206 or the second set of ribbons 207 relative to each other by a distance corresponding to a multiple of $\lambda/4$.

In one mode of operation, light is modulated by moving one set of alternating ribbons relative to a stationary set of alternating ribbons. The ribbons that are moved are referred to as the active ribbons and the stationary ribbons are referred to as the bias ribbons. The active ribbons are moved by any number of means including mechanical means, but are preferably moved by applying a sufficient bias voltage across the active ribbons and the substrate to generate Coulombic attractions between the active ribbons and the substrate.

Now referring to FIG. 2b, when a sufficient bias voltage is applied across the active of ribbons 207 and the substrate 202, the ribbons 207 are displaced relative to the bias ribbons 206 by a distance 211 that is approximately equal to a multiple of $\lambda/4$. Accordingly, the light that is reflected from the surfaces 205' of the active ribbons 207 destructively interferes with the light that is reflected from the surfaces 204 of the bias ribbons 206. It will be clear to one skilled in the art that an optical MEM device may be configured to modulated an incident light source having a wavelength $\lambda$ in other operative modes. For example, both sets of ribbons 206 and 207 may be configured to move such that they are separated by multiples of $\lambda/4$ in order to alternate between conditions for constructive and destructive interference to modulate light having a wavelength $\lambda$.

The ribbons of the MEM devices, described in FIGS. 1a–b and FIGS. 2a–b, are preferably hermetically sealed within a die structure. Methods and materials used for providing a hermetically sealed die are described in the U.S. patent application Ser. No. 09/124710, filed Jul. 29, 2001, entitled "METHOD OF AND APPARATUS FOR SEALING AN HERMETIC LID TO A SEMI CONDUCTOR DIE", now U.S. Pat. No. 6,303,986, the contents of which are hereby incorporated by reference.

The present invention is directed to optical MEM devices and systems which comprise ribbon structures that are preferably formed directly on a silicon wafer substrate, wherein the silicon wafer substrate is selectively etched in the regions corresponding to the center portions, or active portions of the ribbons. In accordance with the embodiments of the invention, an optical MEM device is formed without requiring the deposition of a sacrificial layer, such as polysilicon, prior to etching step(s). Further, the number of dielectric surfaces in the resultant device can be reduced and, therefore, devices can be made which exhibit reduced charging characteristics. Also, because the time consuming step of depositing a sacrificial layer is not required for fabricating optical MEM devices, in accordance with the embodiments of the invention, optical MEM devices can be fabricated using a process flow having greater compatibly with standard CMOS materials and/or IC wafer processing steps.

Figure 3A:
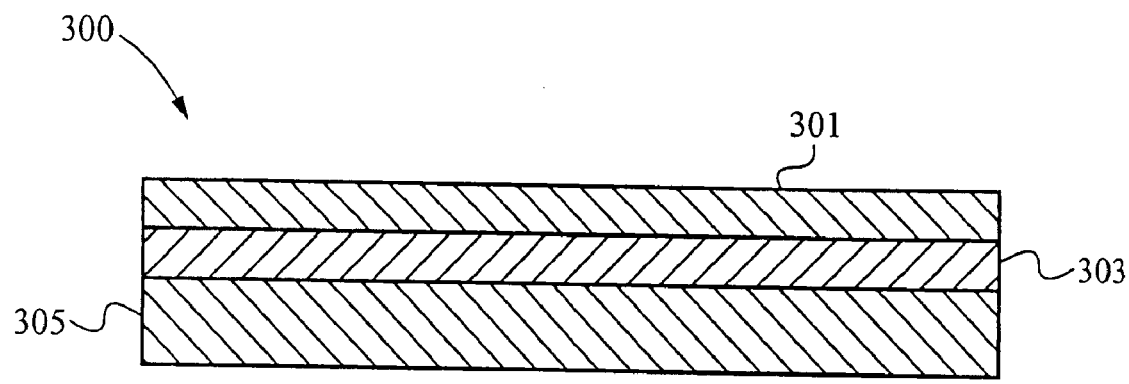
FIG. 3a shows a cross-sectional view of a ribbon structure, in accordance with the embodiments of the invention.

FIG. 3a shows a cross-sectional view of a micro-structure 300 formed in accordance with the embodiments of the invention. The device layer 300 has a silicon based layer or support layer 305 that is preferably silicon nitride with a thickness in a range of about 800 to about 1200 Angstroms. The micro-structure 300 also has a reflective layer 301 that is preferably formed from a metal and has a thickness in a range of about 500 to about 1500 Angstroms. The reflective layer 301 can be formed from any number of metals and metal alloys, but is preferably formed from aluminum or some other metal that can be deposited using sputtering techniques at relatively low temperatures.

Still referring to FIG. 3a, the device layer 300 can also have an oxide layer 303, that is preferably a silicon dioxide layer with a thickness in a range of about 800 to about 1800 Angstroms. The oxide layer 303 is preferably interposed between the reflective layer 301 and the layer 305. Alternatively, or in addition to the oxide layer 303, a second oxide layer (not shown) can be formed below the support layer 305.

Figure 3B:
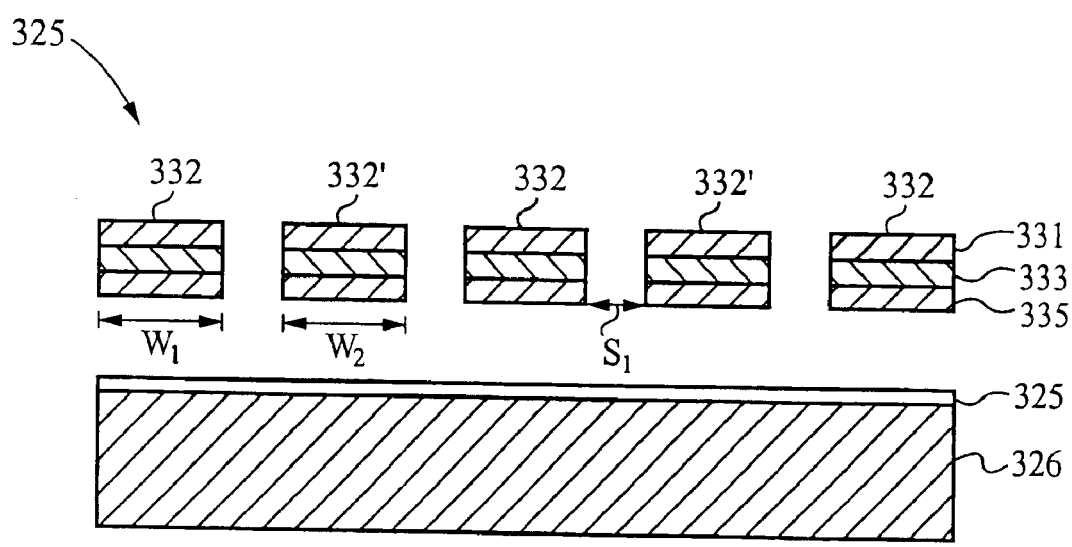
FIG. 3b shows a cross sectional view of a plurality of ribbons having the ribbon structure, shown in FIG. 3a, suspended over a substrate in accordance with the embodiments of the invention.

FIG. 3b shows a portion of a micro-device 325, in accordance with the embodiments of the invention. The micro-device 325 preferably has a plurality of ribbon structures 332 and 332' suspended over a substrate 326. The ribbon structures 332 and 332' are preferably formed from a multi-layer structure device layer, such as described above, wherein the ribbon structures 332 and 332' comprise a nitride layer 335, a metal layer 331, and one or more oxide layers 333. The plurality of ribbons 332 and 332' can comprise an alternating first set of ribbons 332 and second set of ribbons 332' which are moved relative to each other, such as described above. In accordance with the embodiments of the invention, the ribbons 332 and 332' move in opposite directions. In alternative embodiments, one set of the ribbons 332 or 332' moves while the other set of ribbons remains stationary. In yet other embodiments, the micro-device 325 is configured to operate in two or more modes of operation, whereby the micro-device 325 is configured to move one set of ribbons 332 and 332' in one of the modes of operation and both sets of the ribbons 322 and 322' in another of the modes of operation. Also, the ribbons can be configured to operate in a contact mode, whereby ribbons contact the substrate (such as shown in FIGS. 1a–b), or the ribbons can be configured to operate in a non-contact mode (such as shown in FIGS. 2a–b), wherein the ribbons do not contact the substrate.

In accordance with the embodiments of the invention, the substrate 326 can have a layer 325 of reflective material. The ribbon structures 332 and 332', shown in FIG. 3b, all have uniform widths $W_1$ and $W_2$ and spacings $S_1$. However, any number of ribbon constructions, configurations or arrangements are considered to be within the scope of the present invention. For example, a micro-device can be fashioned with ribbons having varied widths $W_1$ and $W_2$ and varied spacings $S_1$. Examples of micro-devices with ribbons having varied widths $W_1$ and $W_2$ and varied spacings $S_1$ for optimized contrast are further described in U.S. patent application Ser. No. 09/802,619, filed Mar. 08, 2001, entitled "HIGH CONTRAST GRATING LIGHT VALVE", the contents of which is hereby incorporated by reference. Also, while the preferred micro-structure(s) comprise the silicon nitride layer 335, the reflective metal layer 331 and one or more oxide layer(s) 333, it is understood that the compositions and thicknesses of the layers 331, 333 and 335 can be varied without departing from the spirit and scope of the embodiments. For example, the metal layer 331 can be formed from an alloy of metals, and the nitride 335 and/or oxide layer(s) 333 can contain impurities and/or dopants, such a boron, phosphorus and the like.

Figure 4:
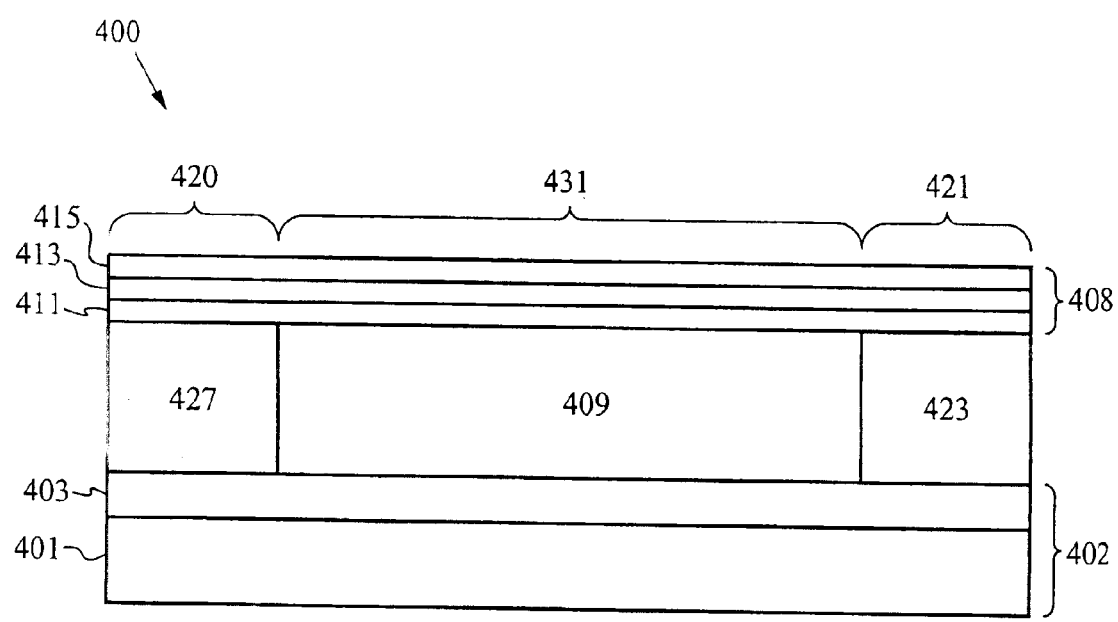
FIG. 4 illustrates a cross-sectional representation of a micro-device comprising a multi-layer ribbon structure, in accordance with the embodiments of the invention.

FIG. 4 illustrates a cross-sectional representation of a micro-device 400 comprising a multi-layer ribbon structure 408, in accordance with the embodiments of the invention. The micro-device 400 comprises a substrate 402, which can comprise a silicon layer 401 and an oxide layer 403, or, alternatively, the substrate 402 is a silicon wafer without an oxide layer. The ribbon structure 408 preferably comprises a layer of silicon nitride 411 and a reflective layer 415 of aluminum, as previously described. In further embodiments, a layer of oxide 413 is provided between the nitride layer 411 and the reflective layer 415. The preferred thickness of the oxide layer 413 varies depending on the application at hand, but a thickness of about 500 to about 2000 Angstrom is suitable for most applications.

Still referring to FIG. 4, the ribbon structure 408 is preferably suspended over the substrate 402 such that there is one or more gaps 409 between the ribbon 408 and the substrate 402. Preferably, the ribbon structure 408 is coupled to the substrate 402 through securing regions 423 and 427 comprising doped or un-doped silicon, such as described below. The securing regions 423 and 427 can form posts and/or anchors to support the ribbon structure 408, as is well known in the art. The device 400 preferably comprises a plurality of ribbons (not shown), wherein ribbon pairs are configured to move relative to each other and modulate light, as described above.

FIGS. 5a–e will now be used to illustrate steps for making a micro-device, in accordance with the embodiments of the invention. Micro-structures are formed on a suitable substrate 502. The substrate 502 comprises a wafer layer 503, that is preferably a layer of single crystal silicon.

Figure 5D:
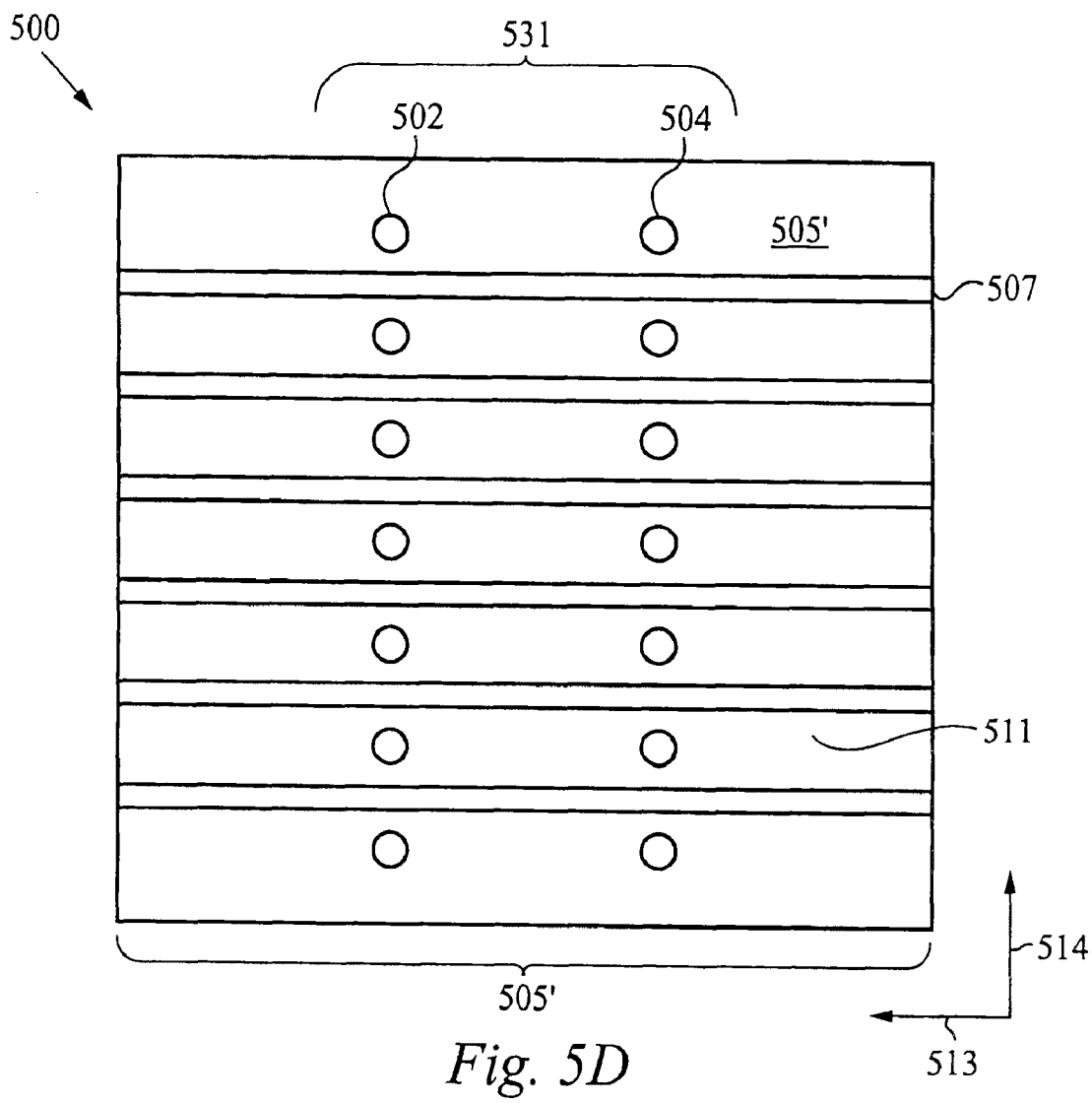

Referring to FIG. 5b, a device layer 505 is formed directly on the wafer layer 503. The device layer 505 preferably comprises one or more layers of silicon nitride, oxide and a reflective layer, as explained above. After the device layer 505 is formed on the wafer layer 503, the device layer 505 is cut into ribbons 511 such as shown in FIG. 5d.

The device layer 505 is cut or patterned into ribbons 511 using any suitable technique, but preferably the device layer 505 is cut or patterned using conventional photo-lithography techniques and/or steps. For example, a photo-resist layer (not shown) is formed on the device layer 505. The photo-resist is patterned and developed to form a patterned photo-resist mask. Portions of the pattern photo-resist layer are removed using conventional techniques leaving mask patterned with the ribbon cuts 507. The ribbon cuts 507 are then etched to form the patterned device layer 505' patterned with electrically isolated ribbons 511, as shown in FIG. 5d. FIG. 5d shows the top view of the device 500 shown in FIG. 5c, wherein a line 513 shows an x-axis of the device 500 and a line 515 shows the y-axis of the device 500. A z-axis 514 of the device 500, shown in FIG. 5d, is normal to the view shown in FIG. 5c.

Referring to FIGS. 5c–d, in accordance with further embodiments, the device structure 500 is also provided with a plurality of access holes and/or trenches 502 and 504 in addition to the ribbon cuts 507. The access holes and/or trenches 502 and 504 are provided to facilitate the local etching rate under central portions 531 of the ribbons. The access holes and/or trenches 502 and 504 are preferably formed with average diameters in a range of about 0.4 to about 1.5 microns and more preferably with average diameters in a range of about 0.6 to about 0.8 microns. The device layer 505 (FIG. 5b) is patterned with the access holes and/or tenches 502 and 504 in the same step as the ribbon cuts 507 or in a different step.

Figure 5E:
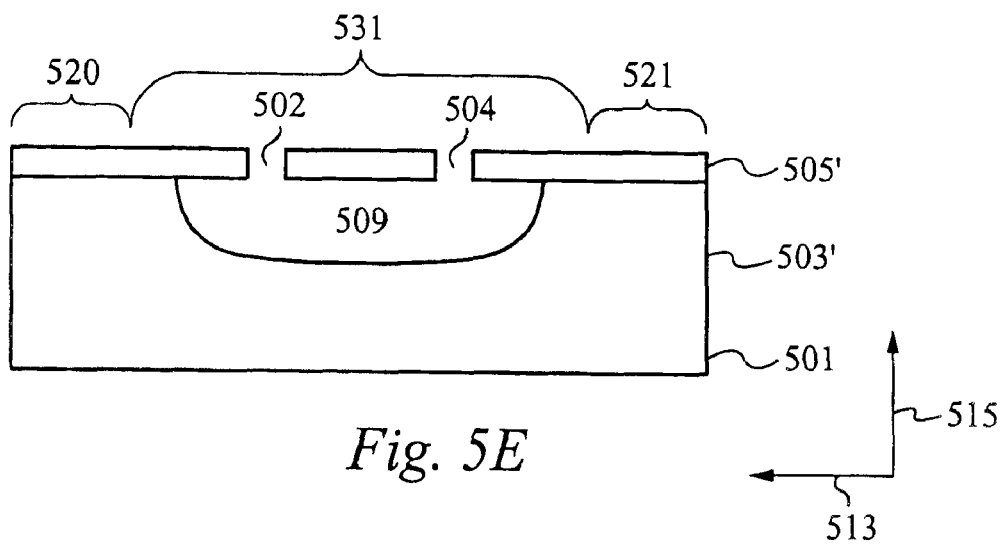

Now referring to FIG. 5e, after the device layer 505 is patterned with ribbon cuts 507 and/or access holes and/or trenches 502 and 504 to form the patterned device layer 505', then the intermediate device structure 500 is treated with a selective etching process to etch a cavity 509 under the center portions 531 of the ribbons 511, while end portions 520 and 521 remain attached to the etched wafer layer 503'. The remaining portion of the etched wafer layer 503' residing underneath the end portions 520 and 521 act as a support structure for the ribbons 511. The cavity 509 is preferably formed by etching the device structure 500 with an enchant comprising noble gas fluoride. More preferably, the etchant comprises xenon difluoride. Advantages of using xenon difluoride etchant are described by Pister in U.S. Pat. No. 5,726,480, the contents of which are hereby incorporated by reference.

Figure 6A:
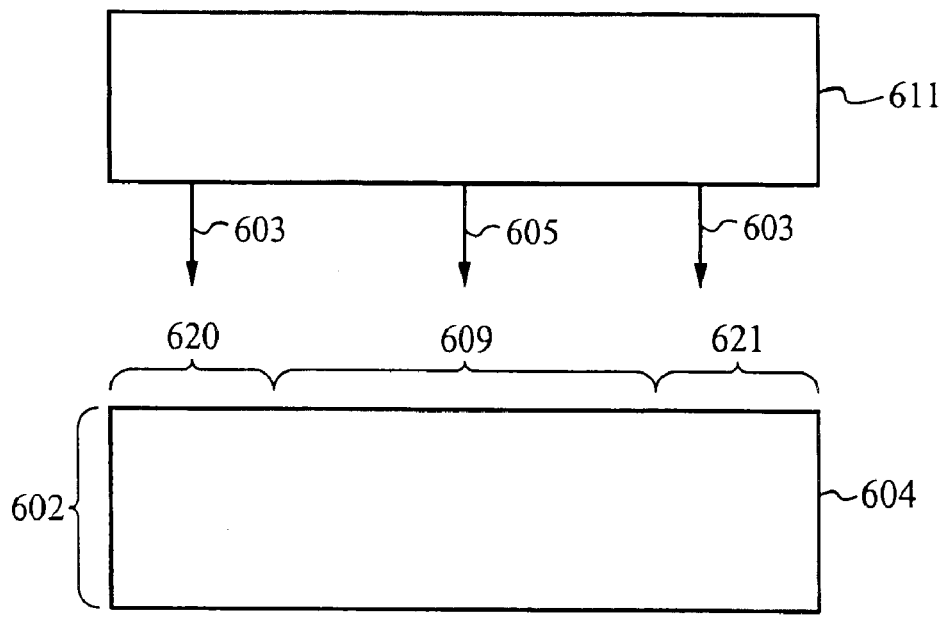
FIGS. 6a–c illustrate steps for selectively modifying a silicon substrate, in accordance with the embodiments of the invention.
Figure 6B:
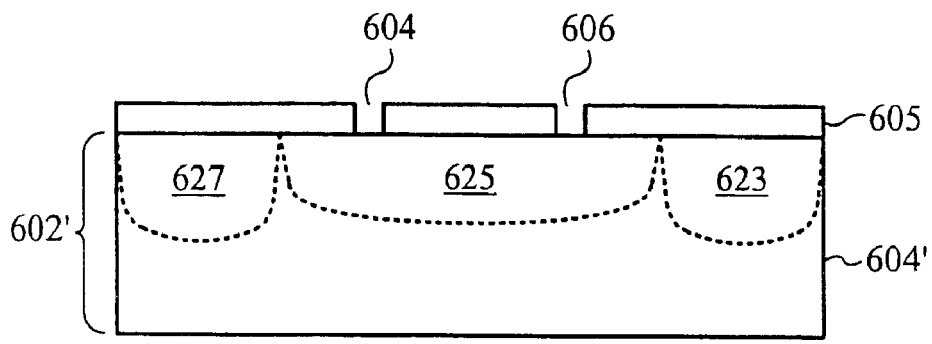

In accordance with the embodiments of the invention, a substrate structure is modified prior to forming a patterned device layer, such as described. Referring to FIG. 6a, a substrate structure 602 preferably comprises a single crystal silicon wafer layer 604. To form a modified substrate structure 602', as shown in FIG. 6b, the substrate 602 is selectively exposed to an ion source 611. The ion source 611 is configured to emit one or more ionic species 603 and 605, with a sufficient energy to implant the ions 603 and 605 into the single crystal silicon layer 604 through the outer regions 620 and 621 and/or through the central region 609 of the wafer layer 604. Preferably, the implanted ions render outer portions 627 and 623 of the modified layer 604' less reactive to the etch process than a central portion 625, render the central portion 625 of the modified layer 604' more reactive to etch process or a combination thereof.

Figure 6C:
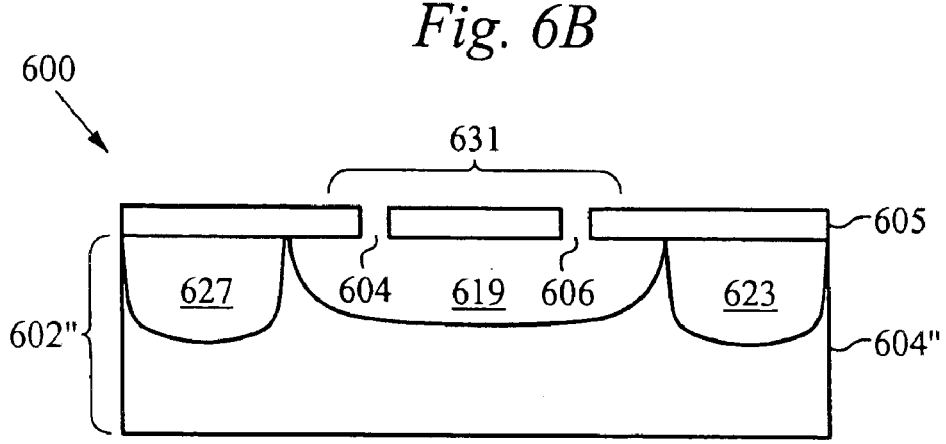

Still referring to FIG. 6b, after the modified substrate structure 602' is formed with the desensitized outer portions 627 and 623 and/or the sensitized central portion 625, then a patterned device layer 605 is formed directly over the modified layer 604'. Referring to FIG. 6c, the modified layer 604' is etched to form a cavity 619, wherein the central portion 631 of the patterned device layer 605 is suspended over the etched substrate 602" and attached to the etched substrate 602" through the end portions 627 and 623 of the etched silicon layer 604". The device 600 preferably comprises a plurality of ribbons (not shown), wherein ribbon pairs are configured to move relative to each other and modulate light, as described above.

Figure 7:
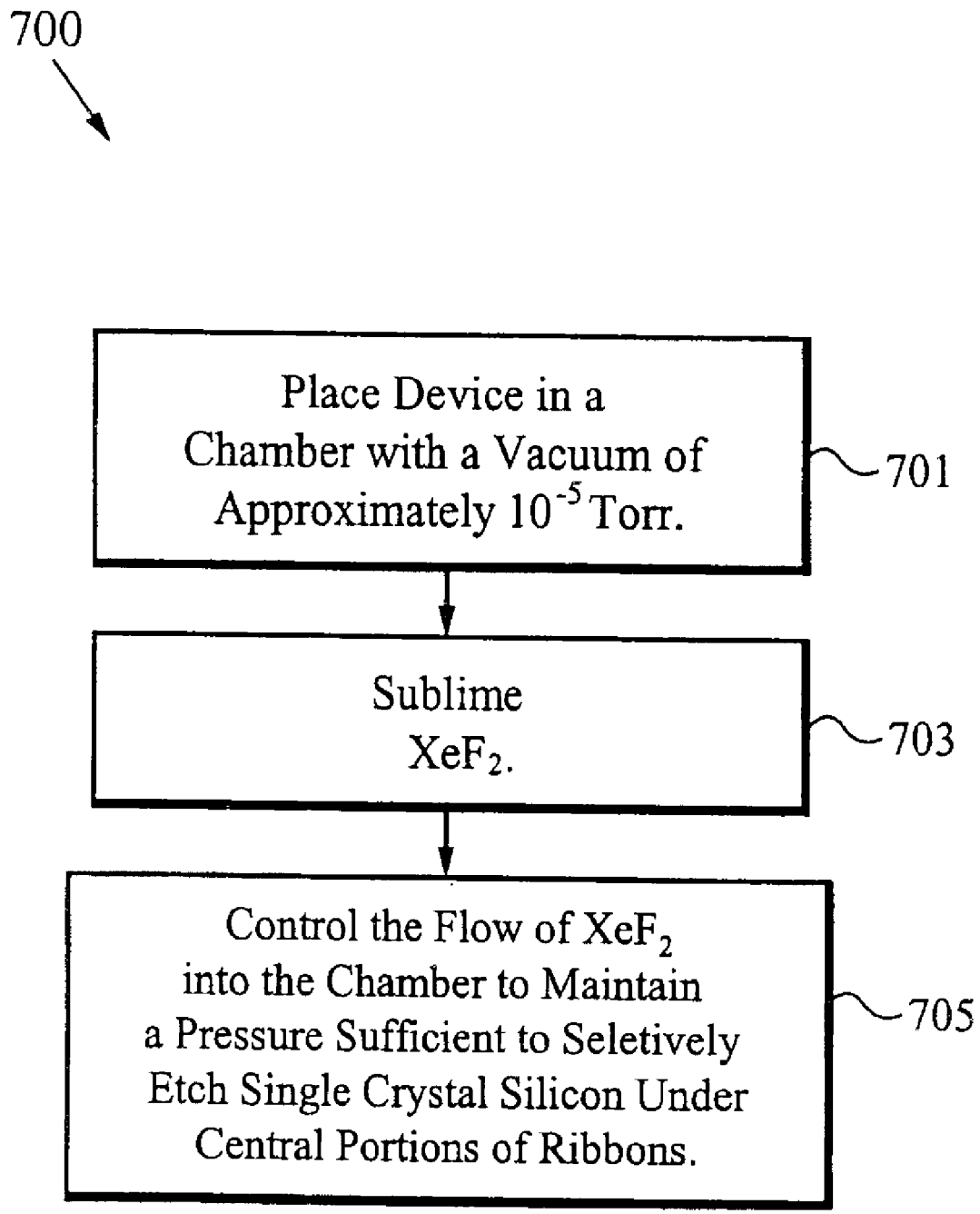
FIG. 7 is a block diagram outlining the steps of selectively etching a cavity into a silicon wafer, in accordance with the embodiments of the invention.

FIG. 7 is a block diagram 700 outlining the preferred method of etching an intermediate device structure patterned device layer patterned with ribbon cuts and/or access holes, such as illustrated in FIGS. 5c–d and FIG. 6b. Referring to FIG. 7, in the step 701 the intermediate device structure is place under a vacuum within a chamber, wherein the partial pressure of water is preferably about $5 \times 10^{-4}$ Torr or less. In the step 703, xenon difluoride crystals are preferably sublimed at a pressure in a range of about 0.1 to about 100 Torr, more preferably in a range of about 0.5 to about 20 Torr and most preferably at approximately 4.0 Torr. In the step 705, a controlled stream of xenon difluoride is provided to the chamber, which is preferably a chamber of a cluster tool equipped with a load lock for transferring the device in and out of the chamber and/or between processing chamber within the cluster tool. The chamber is preferably maintained at a pressure lower than the sublimation pressure of the xenon difluoride crystals to ensures a positive flow of the xenon difluoride to the chamber. The pressure in the chamber is preferably maintained in a range of about 0.1 milliTorr to about 10.0 Torr, more preferably in a range of about 1.0 milliTorr to about 100 milliTorr and most preferably at approximately in a range of about 60 to about 80 milliTorr (0.06–0.08 Torr) during the etching steps.

Figure 8:
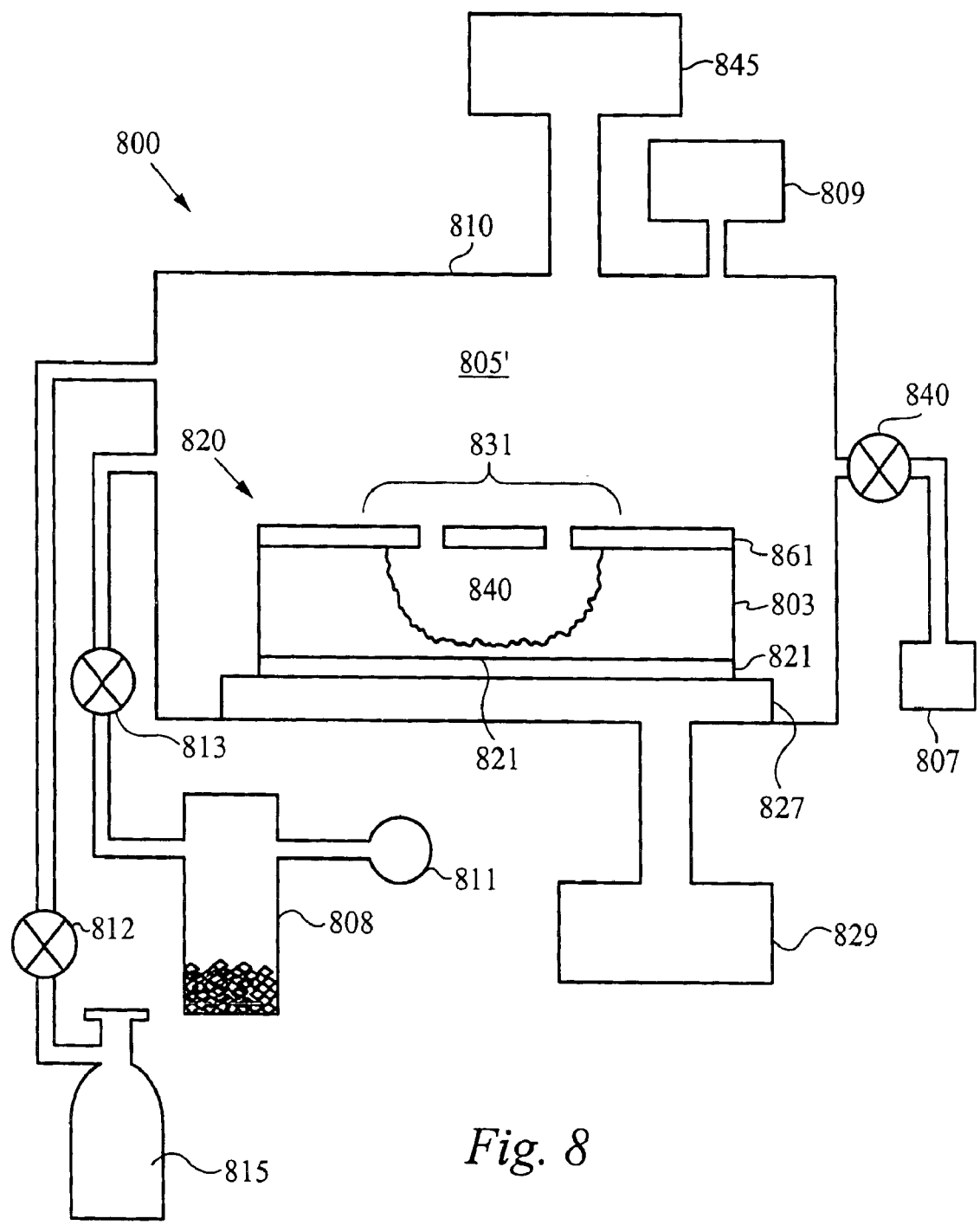
FIG. 8 is a schematic diagram of a chamber apparatus, or processing station, configured to etch a cavity into a silicon wafer, in accordance with the embodiments of the invention.

FIG. 8 illustrates a schematic representation of an etching station 800 in a cluster tool for carrying out the etching steps described above. The etching station 800 is preferably coupled to a load lock 845 for transferring a device 820 in and out of the chamber environment 805' and/or between processing stations (not shown) within the cluster tool. The etching station 800 preferably comprises a vacuum source 807 that is capable of drawing a vacuum in the chamber environment 805'. The etching station 800 preferably includes a pressure measuring device 809 that allows a user to monitor the pressure within a chamber 810. A container 808 of an etchant source (e.g. crystals of xenon difluoride) is coupled to the chamber 810 through a pressure or flow controller 813. The container 808 can have a pressure measuring device 811 coupled to the container 808 to allow the user to monitor the pressure within the container 808.

In operation, the device-structure 820 comprising a patterned device layer 861 and a single crystal silicon layer 803 with or without an etch stop layer 821, is placed in the chamber 810. A vacuum control valve 840 is opened and the vacuum source 807 draws a vacuum reducing the partial pressure of water within the chamber 810 to about $5.0 \times 10^{-4}$ Torr or less. It is preferable that the partial pressure of water within the chamber 810 remains at about $5.0 \times 10^{-4}$ Torr or less during the etching steps in order to maintain a controllable etching process. Under known conditions, the xenon difluoride crystals at room temperature form a vapor pressure of $XeF_2$ of approximately 4.0 Torr, as determined by the pressure measuring device 811. The pressure controller 813 is adjusted to change the pressure of the chamber environment 805' to be in a range of 60 to about $80 \times 10^{-3}$ Torr. The structure 820 is etched for a time sufficient to form a cavity 840 and to release a central portion or portions 831 of the patterned device layer 861. The etching conditions provided above are intended to provide a description of the etching process. The preferred conditions of the etching process depends on the etching pressure(s) chosen, the materials used to fabricate the device 820, the size to the cavity 840 needed, physical details of the structure 820 and flow dynamics of the chamber 810.

During the etching step, the device 820 can be cooled or maintained at a temperature of approximately 20 degrees Celsius, through heat sink 827. The heat sink 827 is preferably coupled to a cooling means 829, such as a refrigeration unit for controlling the temperature of the heat sink 827 at or below 20 degrees Celsius. The heat sink 827, is preferably formed from metal or another material suitable for absorbing heat from the device 820, while the device 820 is coupled to the heat sink 827.

After the etching step is complete, a suitable storage environment may then be provided and the device 820 is hermetically sealed die (not shown), such as described in the U.S. patent application Ser. No. 09/124,710, filed Jul. 29, 2001, entitled "METHOD OF AND APPARATUS FOR SEALING AN HERETIC LID TO A SEMI CONDUCTOR DIE", now U.S. Pat. No. 6,303,986, previously referenced. Alternatively, after reestablishing a low pressure vacuum, the chamber may be backfilled with a noble gas. Accordingly, a noble gas source 815 may be coupled to the control chamber 810 through a control valve 812. The chamber environment 805' is flushed with a noble gas by opening the gas valve 812 prior to sealing the device 820 in a die structure.

Because devices are preferably fabricated in accordance with the embodiments of the invention by first forming a patterned device layer directly on a doped or undoped silicon wafer and etching the wafer to release selected portions of the device layer, optical MEM devices can be fabricated without requiring the deposition of a sacrificial layer, such as poly-silicon. Further, the number of dielectric surfaces can be reduced, thereby reducing the charging characteristics of the devices formed. Also, by eliminating the deposition steps required to form a sacrificial layer, the fabrication of MEM devices in accordance with the embodiments of the invention is more compatible with standard CMOS materials and/or IC wafer processing steps than previous methods which typically require deposition of a sacrificial layer.

The above examples have been described in detail to illustrate the preferred embodiments of the instant invention. It will be clear to one of ordinary skill in the art that there are many variations to the invention that are within the scope of the invention. For example, while the embodiments of the invention are directed to optical MEM devices and method for making the same, other micro-structures formed with pattern device on a doped or undoped wafer substrate are contemplated. Accordingly, such references to specific embodiments and details are not intended to limit the scope of the claims appended hereto.

What is claimed is:

1. A device comprising a substrate structure having a cavity with an edge region and micro-structures suspended over the cavity and coupled to the edge region, wherein a member of the micro-structures has an access hole in a central portion thereof that is used during the formation of the cavity to facilitate etching under said central portion, wherein the micro-structures include elongated ribbons coupled to the edge region through opposing ends of the elongated ribbons.

2. The device of claim 1, wherein the substrate comprises silicon and an oxide under-layer.

3. The device of claim 2, wherein the elongated ribbons are coupled to the edge region through support features coupled to the oxide under-layer.

4. The device of claim 1, wherein the elongated ribbons have lengths in a range of about 50 to about 500 microns and widths in a range of 4.0 to 40 microns.

5. A device comprising a substrate structure having a cavity with an edge region and micro-structures suspended over the cavity and coupled to the edge region, wherein the micro-structures include elongated ribbons coupled to the edge region through opposing ends of the elongated ribbons, wherein the substrate comprises silicon and an oxide under-layer, and wherein a portion of the silicon is doped with a dopant selected from the group consisting of boron and phosphorous.

6. A device comprising a substrate structure having a cavity with an edge region and micro-structures suspended over the cavity and coupled to the edge region, wherein a member of the micro-structures has an access hole in a central portion thereof that is used during the formation of the cavity to facilitate etching under said central portion, and wherein the micro-structures comprise a layer of silicon nitride in a range of about 200 to about 2000 Angstroms thick and a layer of aluminum in a range of about 250 to about 2000 Angstroms thick.

7. An optical (micro electro mechanical) MEM device comprising:
   a. means to modulate light comprising a plurality of reflective ribbons suspended over a substrate cavity by opposing ends through securing regions; and
   b. means to move a first set of reflective ribbons relative to a second set of the reflective ribbons, said means comprising a driver circuit coupled to at least one of the first set and second set of ribbons,
   wherein a reflective ribbon includes an access hole in a center portion thereof that is used during formation of the substrate cavity to facilitate etching under said center portion.

8. The optical MEM device of claim 7, wherein the reflective ribbons comprise a layer of silicon nitride in a range of about 200 to about 2000 Angstroms thick and a layer of aluminum in a range of about 250 to about 2000 Angstroms thick.

9. The optical MEM device of claim 7, wherein the securing regions comprise support structures selected from the group consisting of posts and anchor support structures.

10. The optical MEM device of claim 9, wherein the substrate comprises an oxide under-layer and wherein the support structures couple to the oxide under-layer.

11. A method of making a release structure, comprising:
   a. forming a device layer on a silicon wafer; and
   b. forming a cavity in the silicon wafer under a portion of the device layer, such that the device layer is suspended over the cavity and attached at opposing ends of the cavity,
   wherein a suspendable feature is patterned into the device layer prior to forming the cavity,
   wherein the suspendable feature includes an access hole in a central portion thereof that is used during the formation of the cavity to facilitate etching under said central portion, and
   wherein forming the device layer comprises depositing a layer of silicon nitride in a range of about 200 to about 2000 Angstroms thick.

12. The method of claim 11, wherein forming the device layer further comprises depositing a layer of aluminum in a range of about 250 to about 2000 Angstroms thick.

13. A method of making a release structure, comprising:
   a. forming a device layer on a silicon wafer; and
   b. forming a cavity in the silicon wafer under a portion of the device layer, such that the device layer is suspended over the cavity and attached at opposing ends of the cavity,
   wherein forming the device layer comprises depositing a layer of silicon nitride in a range of about 200 to about 2000 Angstroms thick,
   wherein forming the device layer further comprises depositing a layer of aluminum in a range of about 250 to about 2000 Angstroms thick, and
   wherein forming the device layer further comprises depositing a layer of oxide in a range of about 800 to about 1200 Angstroms thick.

* * * * *

UNITED STATES PATENT AND TRADEMARK OFFICE
CERTIFICATE OF CORRECTION

PATENT NO. : 7,027,202 B1 Page 1 of 1
APPLICATION NO. : 10/377994
DATED : April 11, 2006
INVENTOR(S) : Hunter et al.

It is certified that error appears in the above-identified patent and that said Letters Patent is hereby corrected as shown below:

on title page, item [73] insert:

-- Assignee: Silicon Light Machines Corporation, Sunnyvale, CA (US) --

Signed and Sealed this

Seventh Day of November, 2006

JON W. DUDAS
*Director of the United States Patent and Trademark Office*